Nov. 16, 1937. J. R. NOLAN 2,099,137
MACHINE FOR MAKING MATCH PACKETS
Filed Aug. 12, 1936 27 Sheets-Sheet 13

Inventor
John R. Nolan

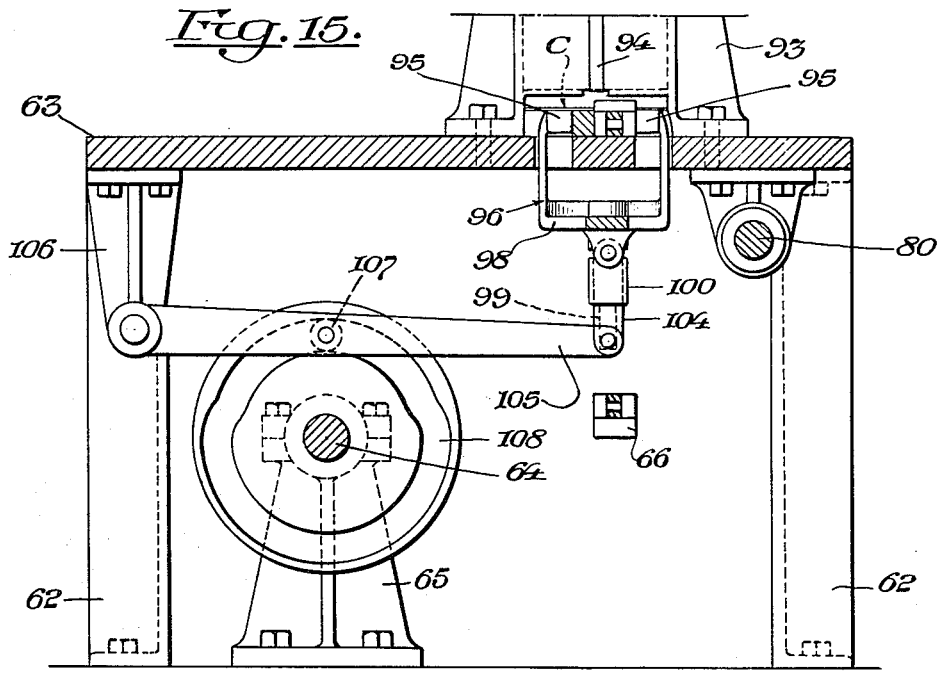
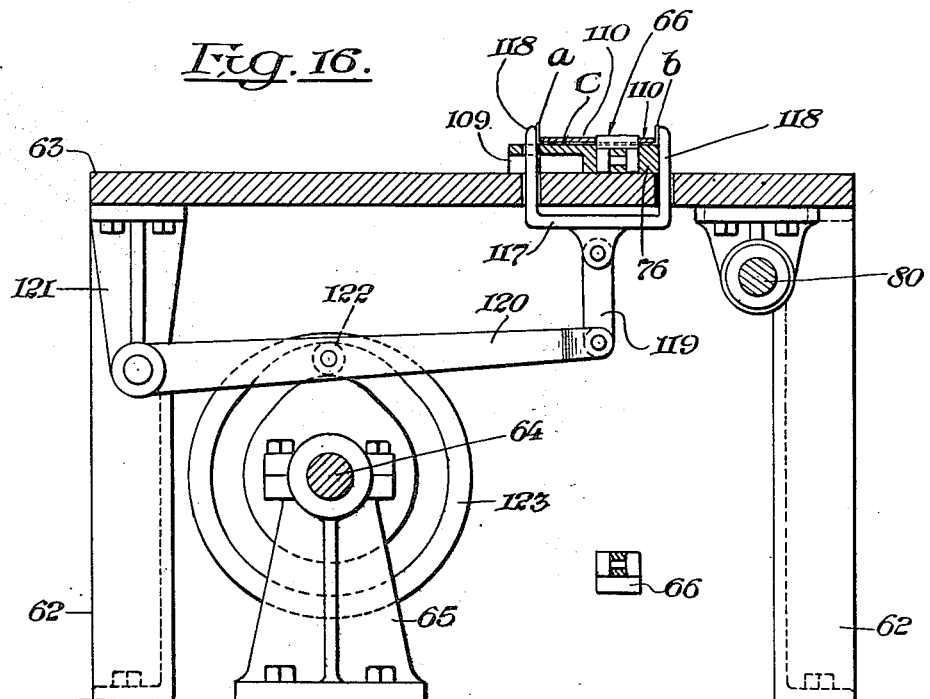

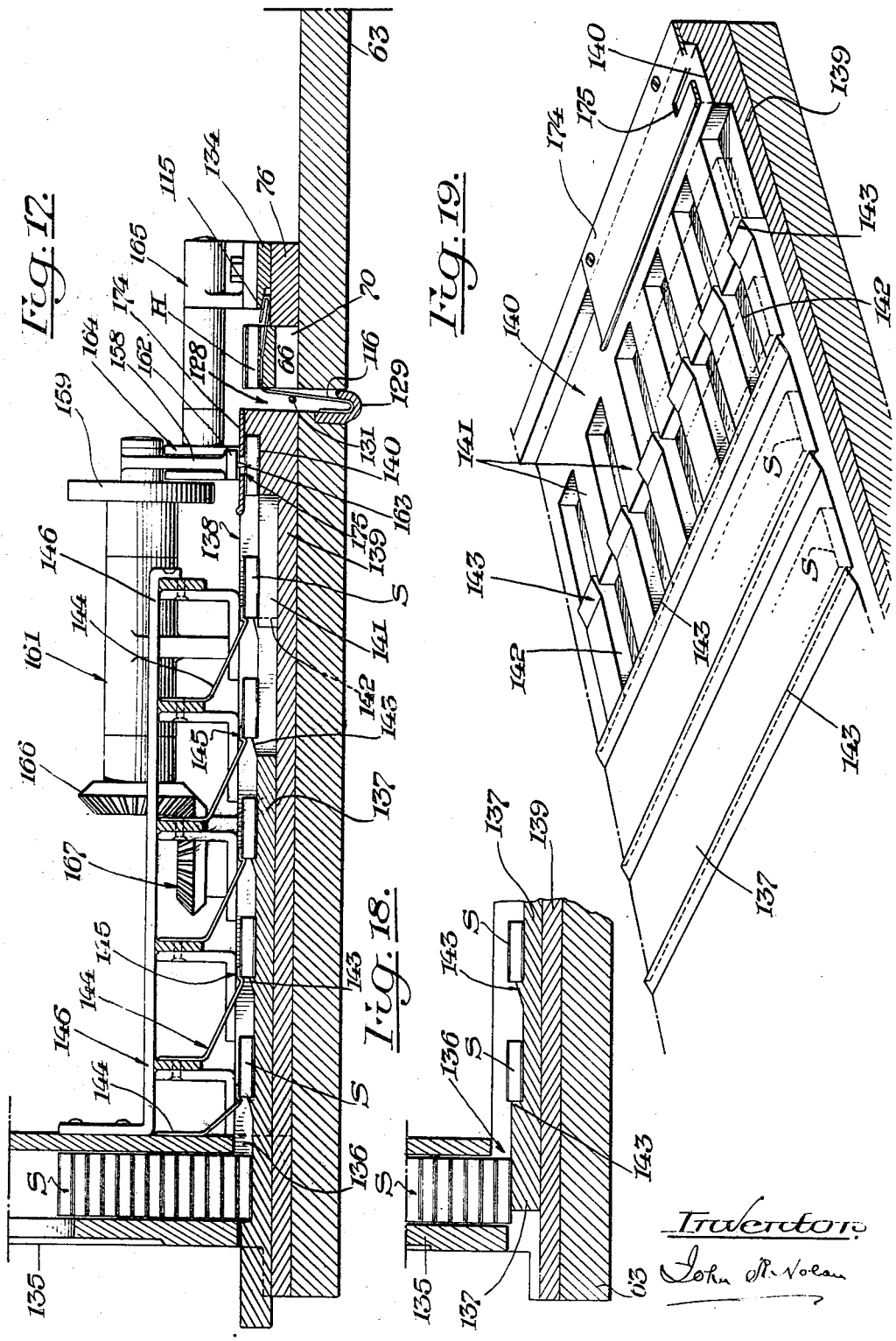

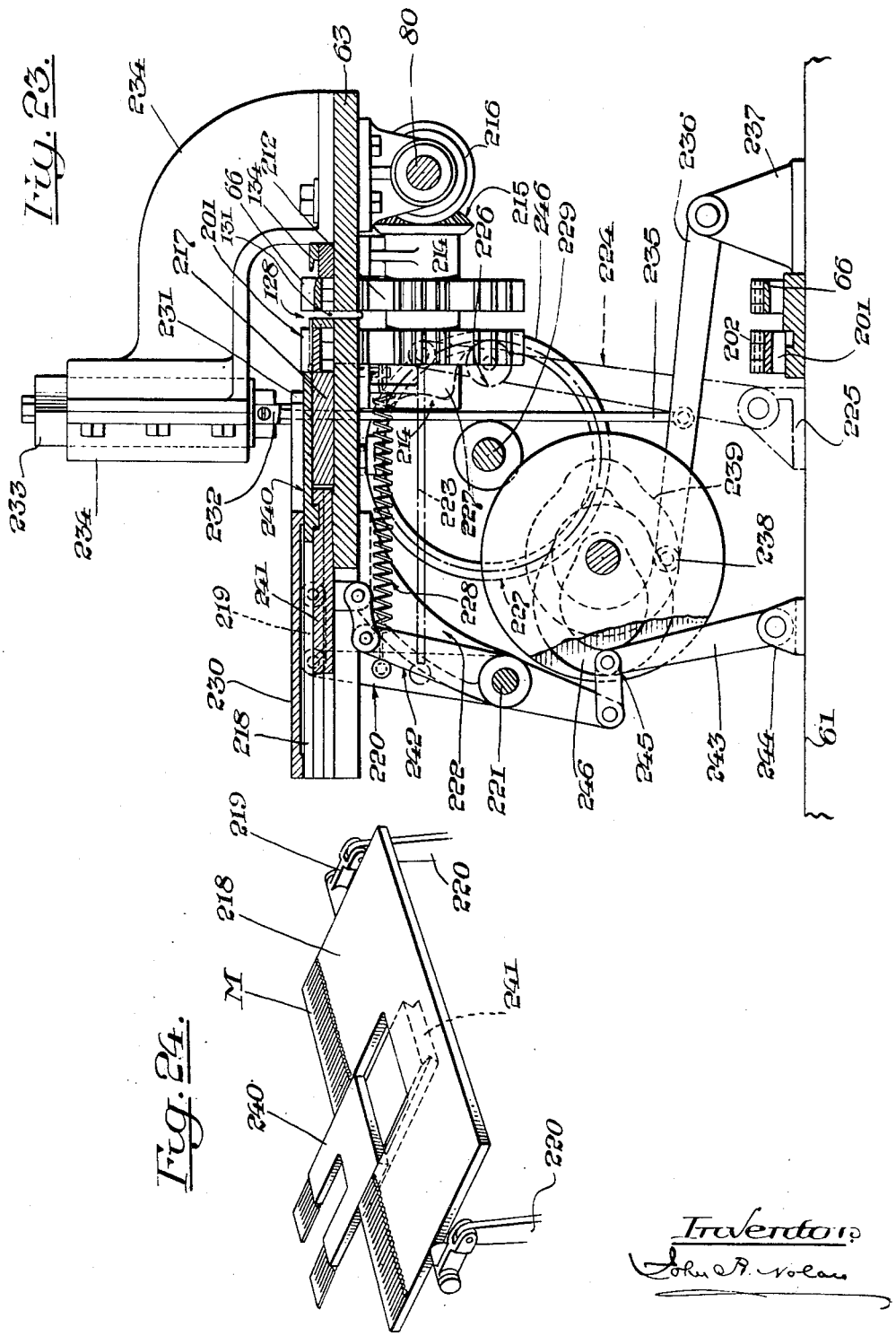

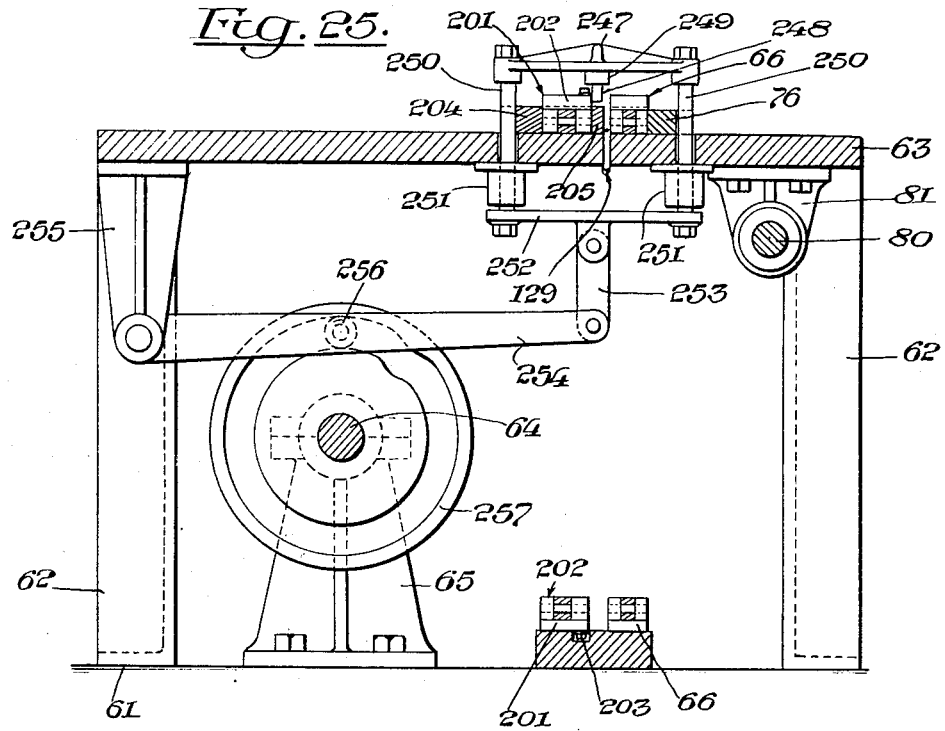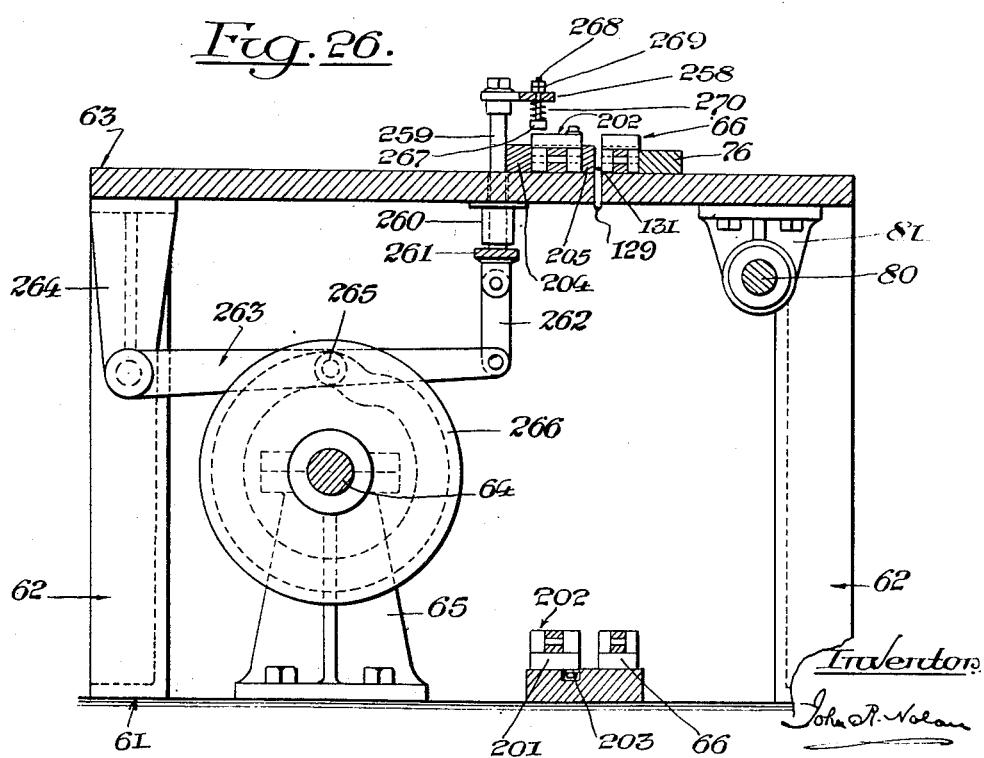

Nov. 16, 1937.   J. R. NOLAN   2,099,137
MACHINE FOR MAKING MATCH PACKETS
Filed Aug. 12, 1936   27 Sheets-Sheet 19
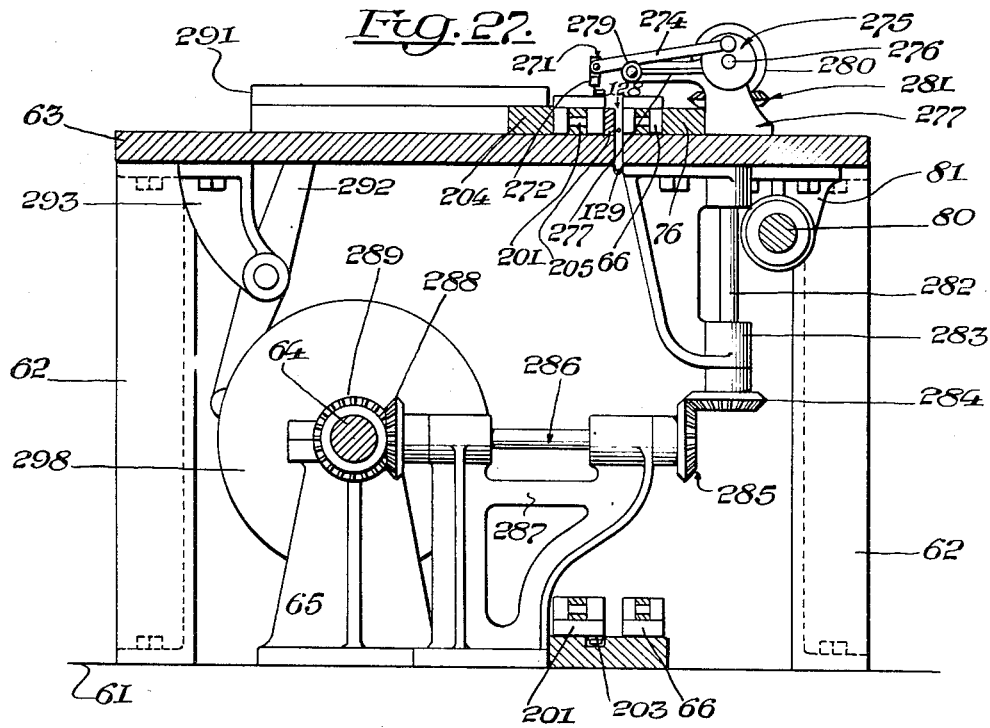
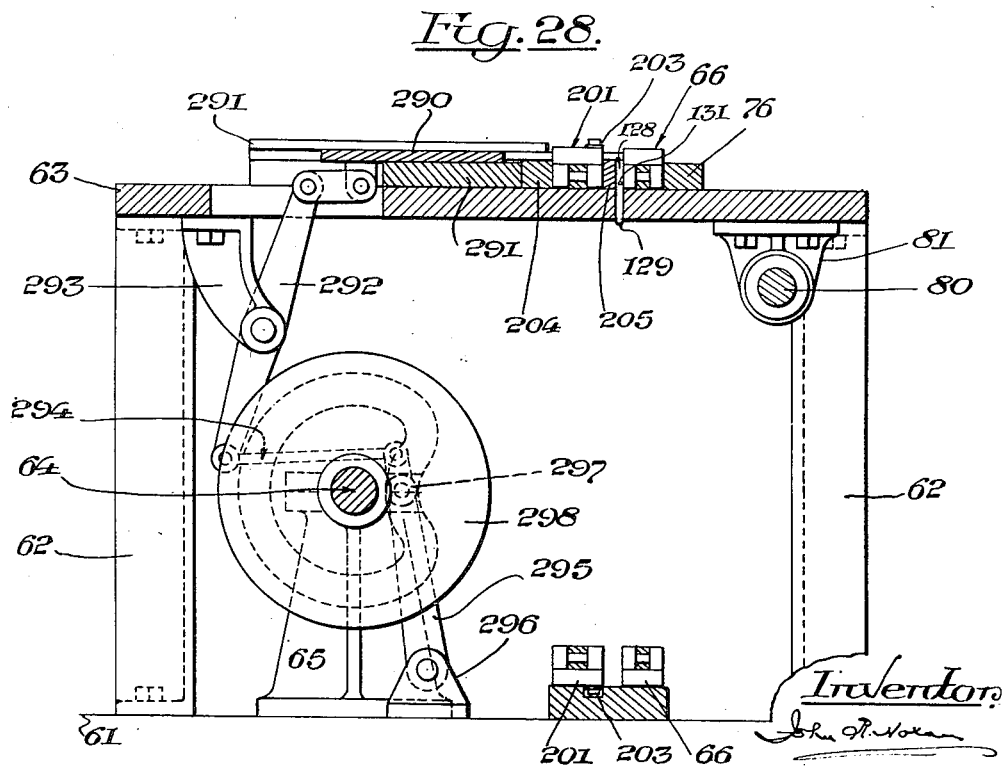

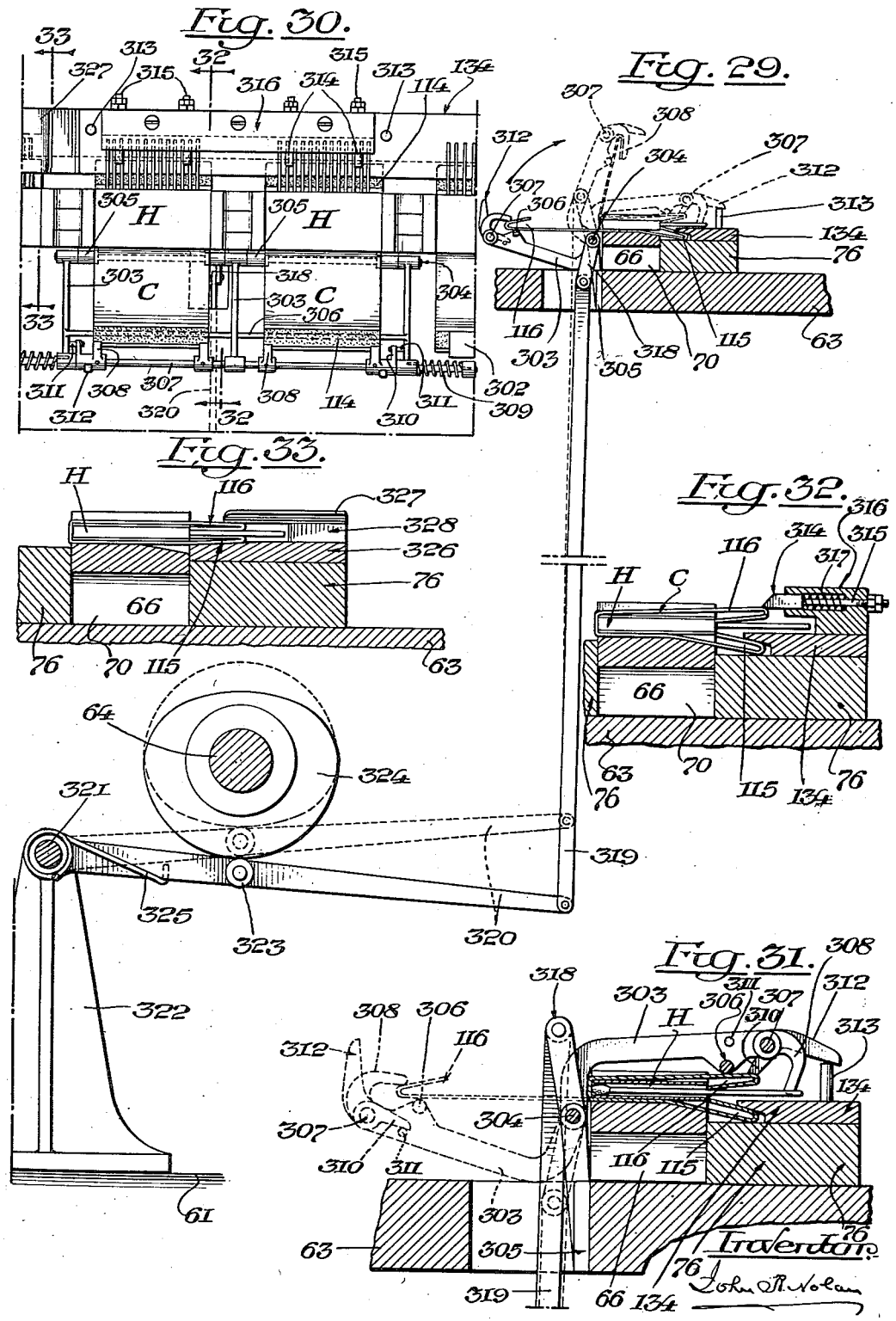

Nov. 16, 1937. J. R. NOLAN 2,099,137
MACHINE FOR MAKING MATCH PACKETS
Filed Aug. 12, 1936 27 Sheets-Sheet 21

Inventor
John R. Nolan

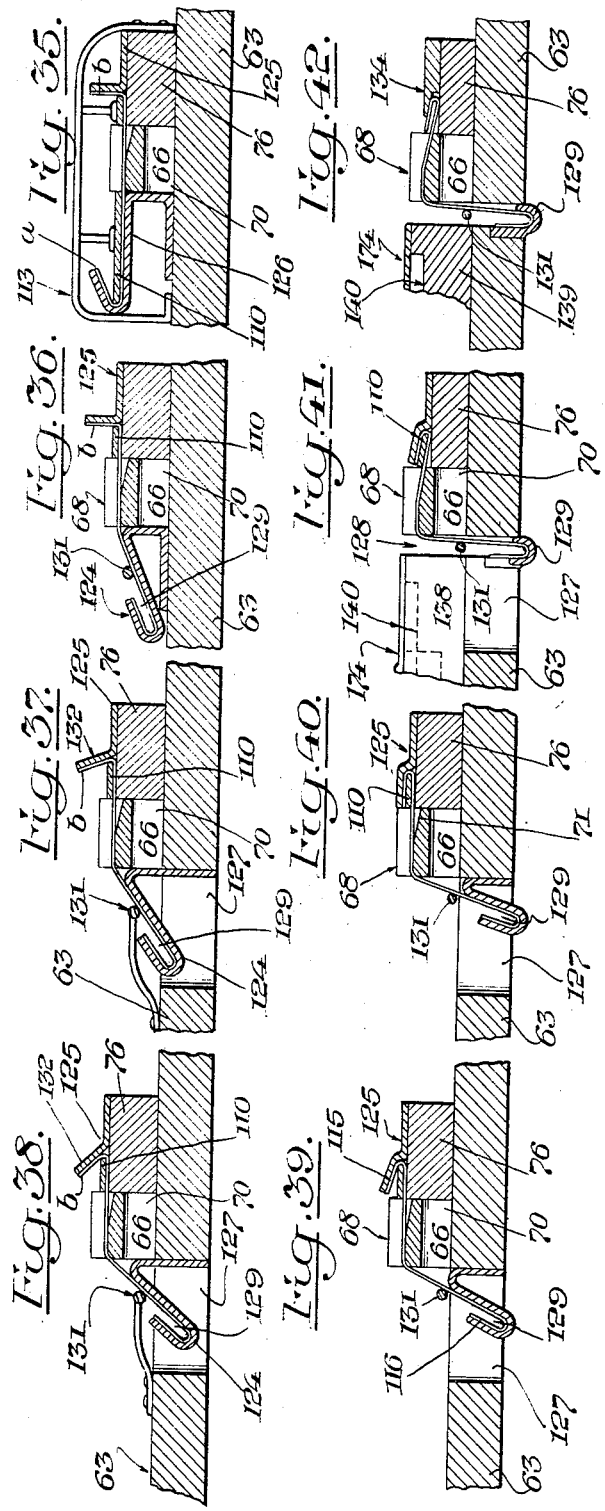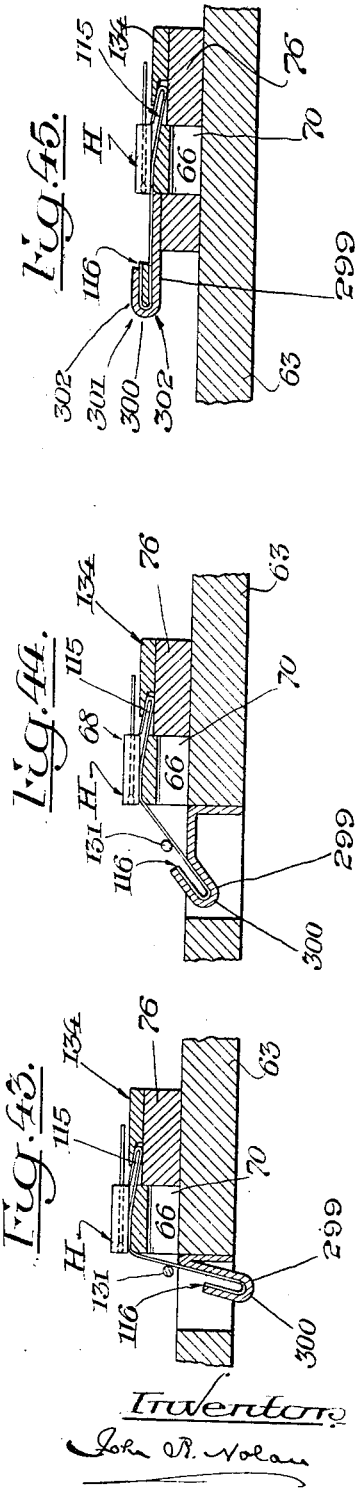

Nov. 16, 1937. J. R. NOLAN 2,099,137
MACHINE FOR MAKING MATCH PACKETS
Filed Aug. 12, 1936 27 Sheets-Sheet 23
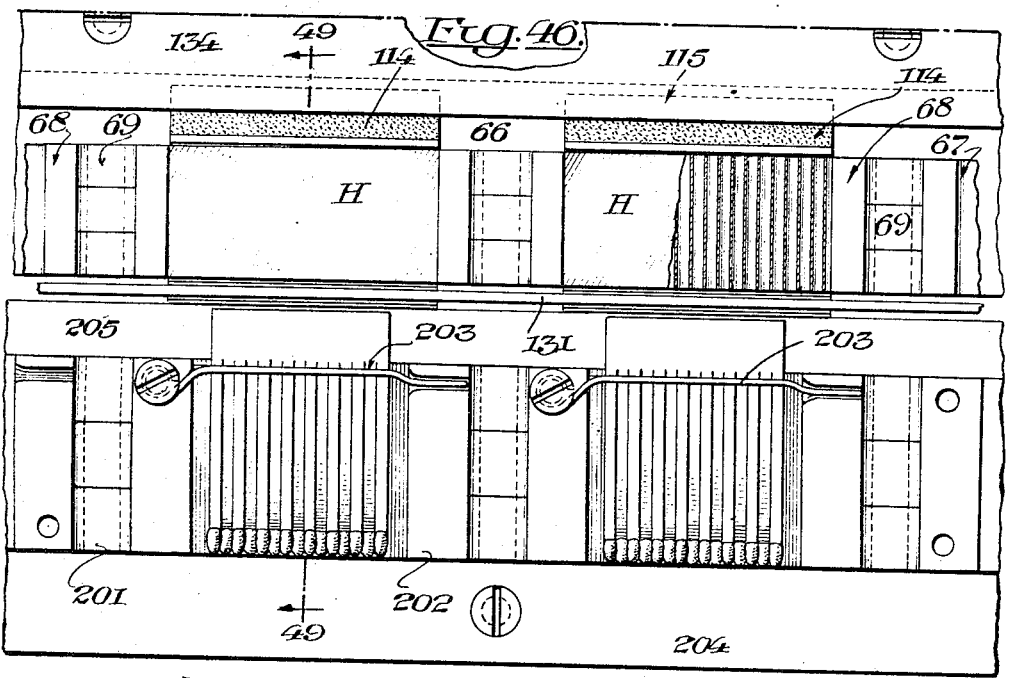

Nov. 16, 1937.   J. R. NOLAN   2,099,137
MACHINE FOR MAKING MATCH PACKETS
Filed Aug. 12, 1936   27 Sheets-Sheet 24
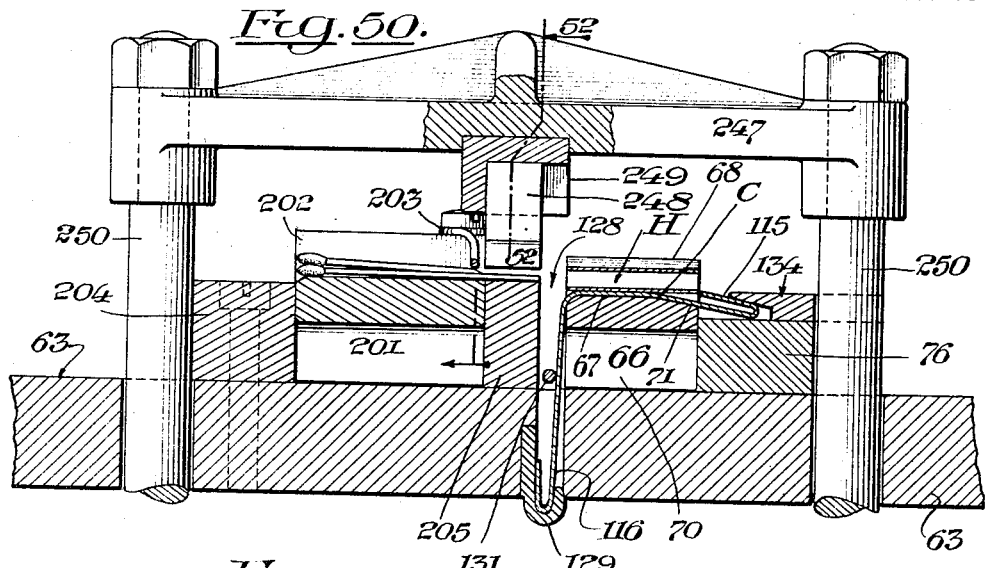
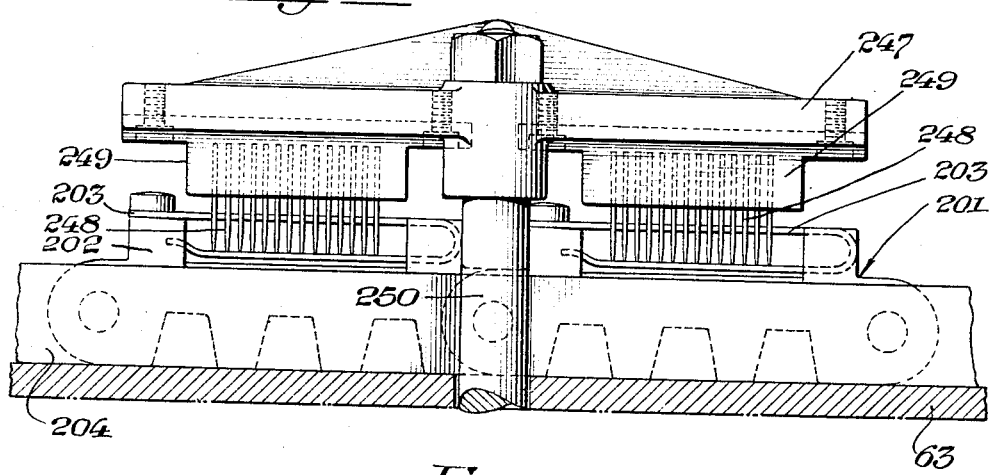
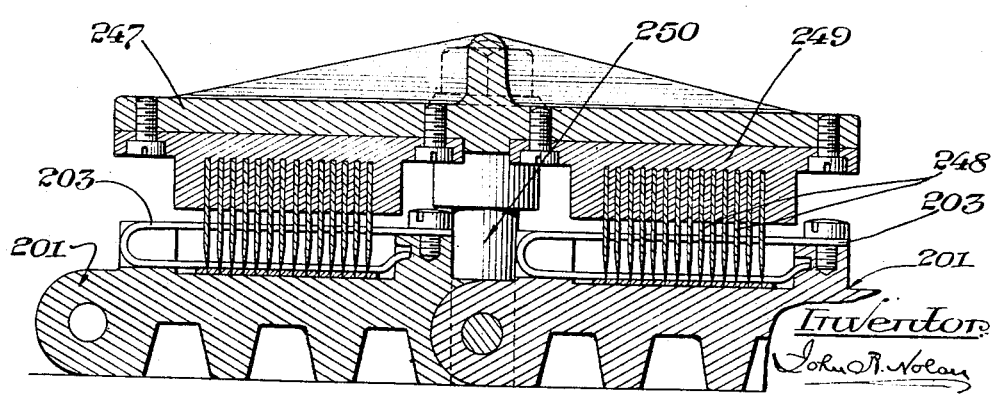

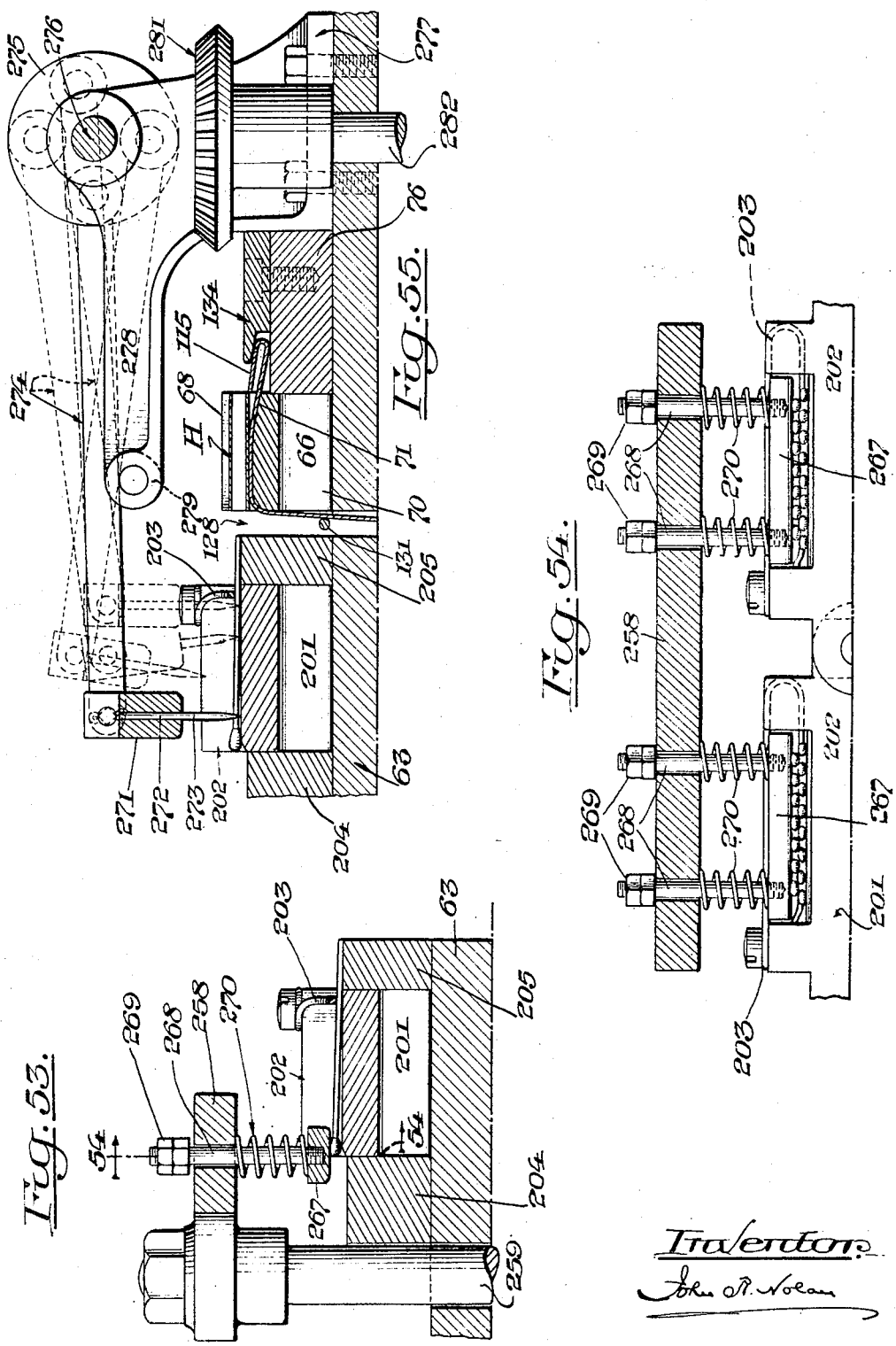

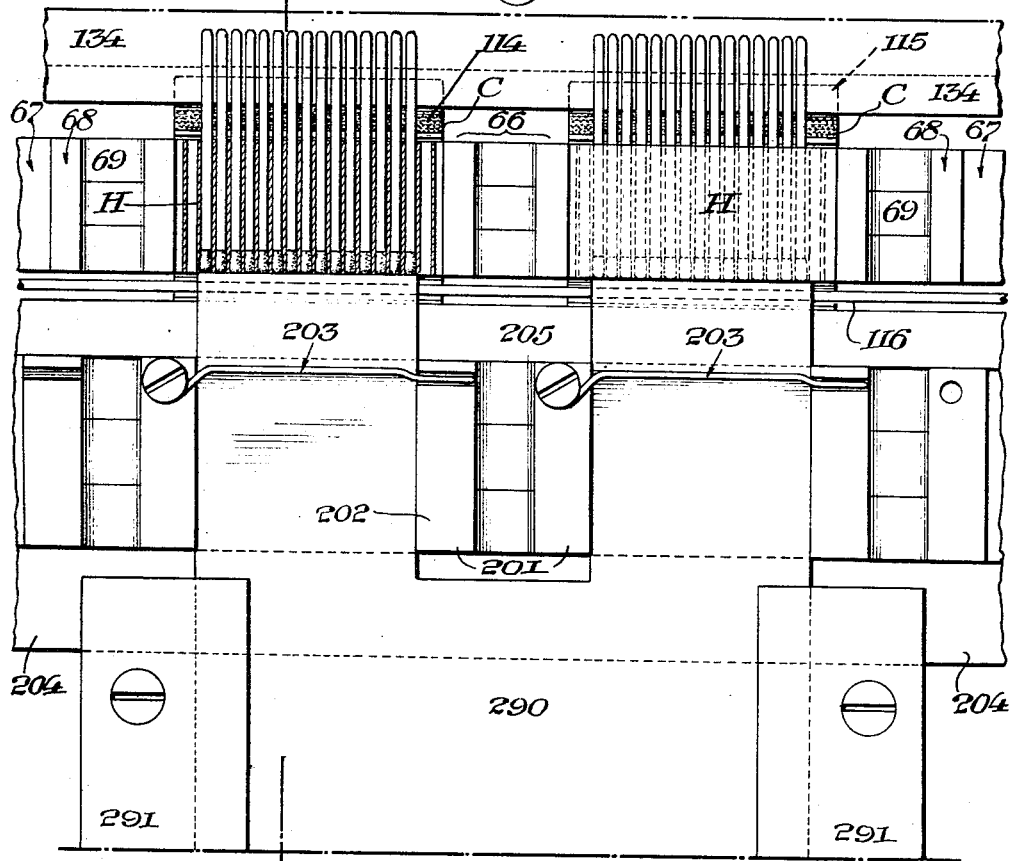
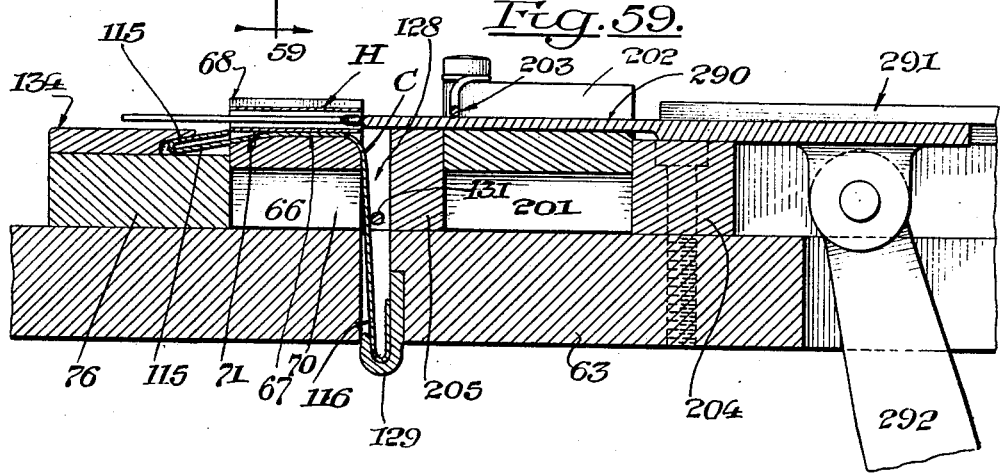

Patented Nov. 16, 1937

2,099,137

UNITED STATES PATENT OFFICE 2,099,137

MACHINE FOR MAKING MATCH PACKETS

John R. Nolan, Larchmont, N. Y., assignor to The Diamond Match Company, Wilmington, Del., a corporation of Delaware Application August 12, 1936, Serial No. 95,534

21 Claims. (Cl. 93—2)

This invention relates to a machine for making match packets, having reference especially, though not exclusively, to a machine for the production of packets of "light-on-withdrawal" matches of the character disclosed in Letters Patent of the United States No. 2,039,491, dated May 5, 1936.

Generally described, the machine herein illustrated embodying my invention comprises two intermittently-movable juxtaposed cover and match conveyers which are concurrently actuated, the cover conveyer extending beyond the respective ends of the match conveyer. The conveyers have equally spaced trough-like links which respectively align with each other in the upper runs of the conveyers, which conveyers present succeeding pairs of their respective links to stations embodying mechanisms whereby the following operations are rapidly and efficiently performed, to wit: Cover strips are applied to and transversely of the links of the cover conveyer at the receiving end thereof so as to extend endwise beyond the respective sides of the conveyer, the projecting portions of the strips being longer at one side of the conveyer than at the other side; the extremities of the projecting portions of the cover strips are bent to provide resilient transverse folds; channeled match holders, preferably of corrugated paperboard, are applied to the links of the cover conveyer and upon the supported cover strips; match cards, each having staggered matches extending from a common base, are applied to the links of the match conveyer; the bases of the match cards are cut longitudinally of the match stems to subdivide the cards into rows of individual matches; the severed matches of each row are shifted to and maintained in spaced parallel relation on the match conveyer; the parallel matches thus supported are inserted endwise into the channels of the match holders in the adjacent links of the cover conveyer so that the handle ends of the stems protrude beyond the respective holders and in close relation to the free edges of the adjacent end folds of the cover strips; the longer projecting portions of the cover strips are folded over the holders and matches borne by the adjacent links of the cover conveyer, so as to position the end folds of such portions upon the projecting ends of the match stems and in overhanging relation to the lower or complementary end folds of the cover strips; the body of the covers encasing the holders are pressed to squeeze the associated holders in close relation to the match stems beyond the match heads; the respective ends of the cover folds at the handle ends of the match stems of each packet are then pinched and fastened together at the ends of the folds, and the packets thus completed are finally discharged from the cover conveyer.

My invention comprises novel features of construction and combinations of elements, which, in a preferred form of embodiment of the invention, will be hereinafter described; the scope of the invention being expressed in the appended claims.

In the drawings—

Fig. 15 is a similar section through the cover conveyer in a plane adjacent the hoppers, as on the line 15—15 of Fig. 1.

Fig. 16 is a similar section in a plane through the mechanism for turning-up the ends of the cover strips borne by the cover conveyer, as on the line 16—16 of Fig. 1.

Fig. 17 is a similar section in a plane through the mechanism for feeding match holder strips from the holder-strip hopper and positioning them laterally adjacent and longitudinally of the cover conveyer, as on the line 17—17 of Fig. 2.

Fig. 18 is a sectional detail showing the holder strip feed plate in its rearward position beneath the holder hopper.

Fig. 19 is a sectional perspective view of a portion of the said feed plate.

Fig. 20 is a transverse vertical section in a plane through the mechanisms for severing the holder strips into successive sections and positioning each succeeding section upon a cover strip borne by the cover conveyer, as on the line 20—20 of Fig. 2.

Fig. 21 is a horizontal section in a plane through the cutter mechanism for the holder strips, as on the line 21—21 of Fig. 20.

Fig. 22 is a sectional detail showing the acting end of the pusher for positioning the match holder sections on the cover strips.

Fig. 23 is a transverse vertical section in a plane through the mechanism for positioning the match cards on a match conveyer located in juxtaposition to the cover conveyer, as on the line 23—23 of Fig. 3.

Fig. 24 is a perspective view of the match strip and match card positioning plungers.

Fig. 25 is a transverse vertical section in a plane through the mechanism for cutting the margins of the match cards longitudinally of the stems, as on the line 25—25 of Fig. 4.

Fig. 26 is a similar section in a plane through the presser mechanism for acting upon and laterally shifting the heads of the matches, as on the line 26—26 of Fig. 4.

Fig. 27 is a similar section in a plane through the mechanism for parallelly spacing the match stems in the match conveyer, as on the line 27—27 of Fig. 4.

Fig. 28 is a similar section in a plane through the mechanism for endwise inserting groups of separated matches in the respective holders borne by the cover conveyer, as on the line 28—28 of Fig. 4.

Fig. 29 is a similar section in a vertical plane through the mechanism for folding the cover strips upon the match-filled holders, as on the line 29—29 of Fig. 5.

Fig. 30 is a plan of a portion of the folding mechanism shown in Fig. 29.

Fig. 31 is a section of the cover conveyer and the adjacent cover folding devices, showing the latter as swung rearward upon the completion of their folding operation upon a cover strip.

Fig. 32 is a vertical section, as on the line 32—32 of Fig. 30, showing the action of a spring latch on the upper portion of the folded cover.

Fig. 33 is a similar section, as on the line 33—33 of Fig. 30, showing a guide for the ends of the folded covers.

Figure 1:
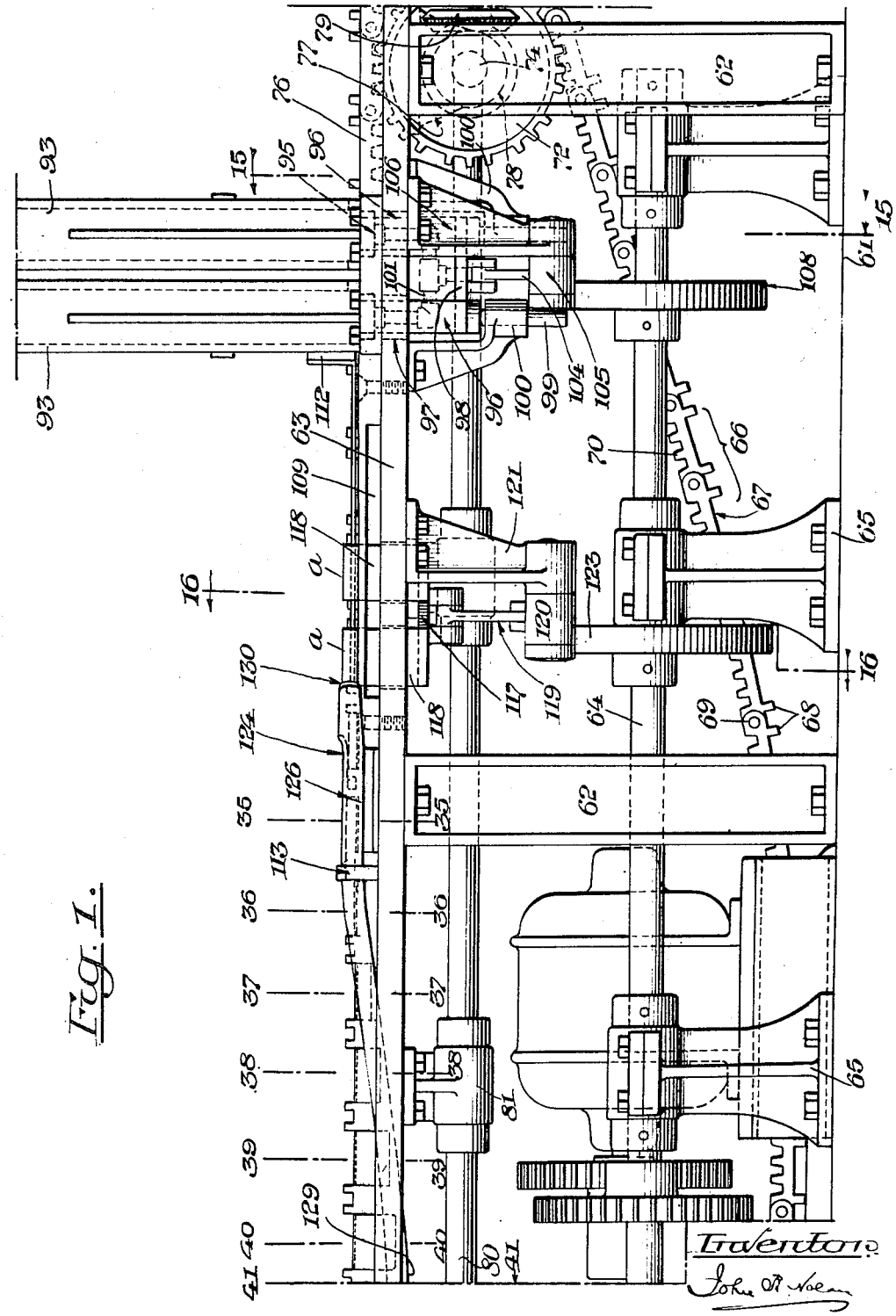
Figures 1, 2, 3, 4, 5 and 6 are succeeding views in front elevation of a machine embodying my invention.
Figure 2:
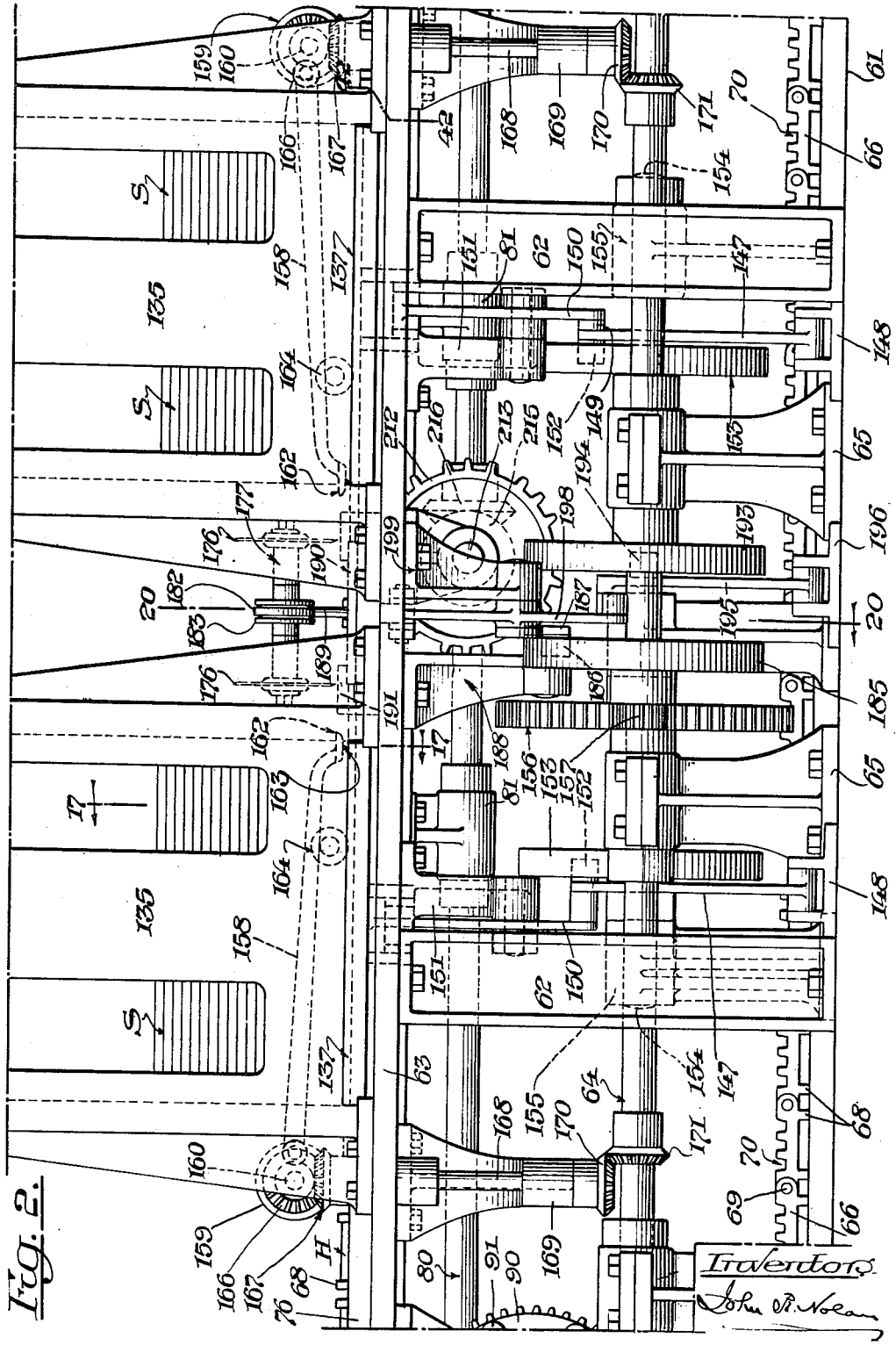
Figure 3:
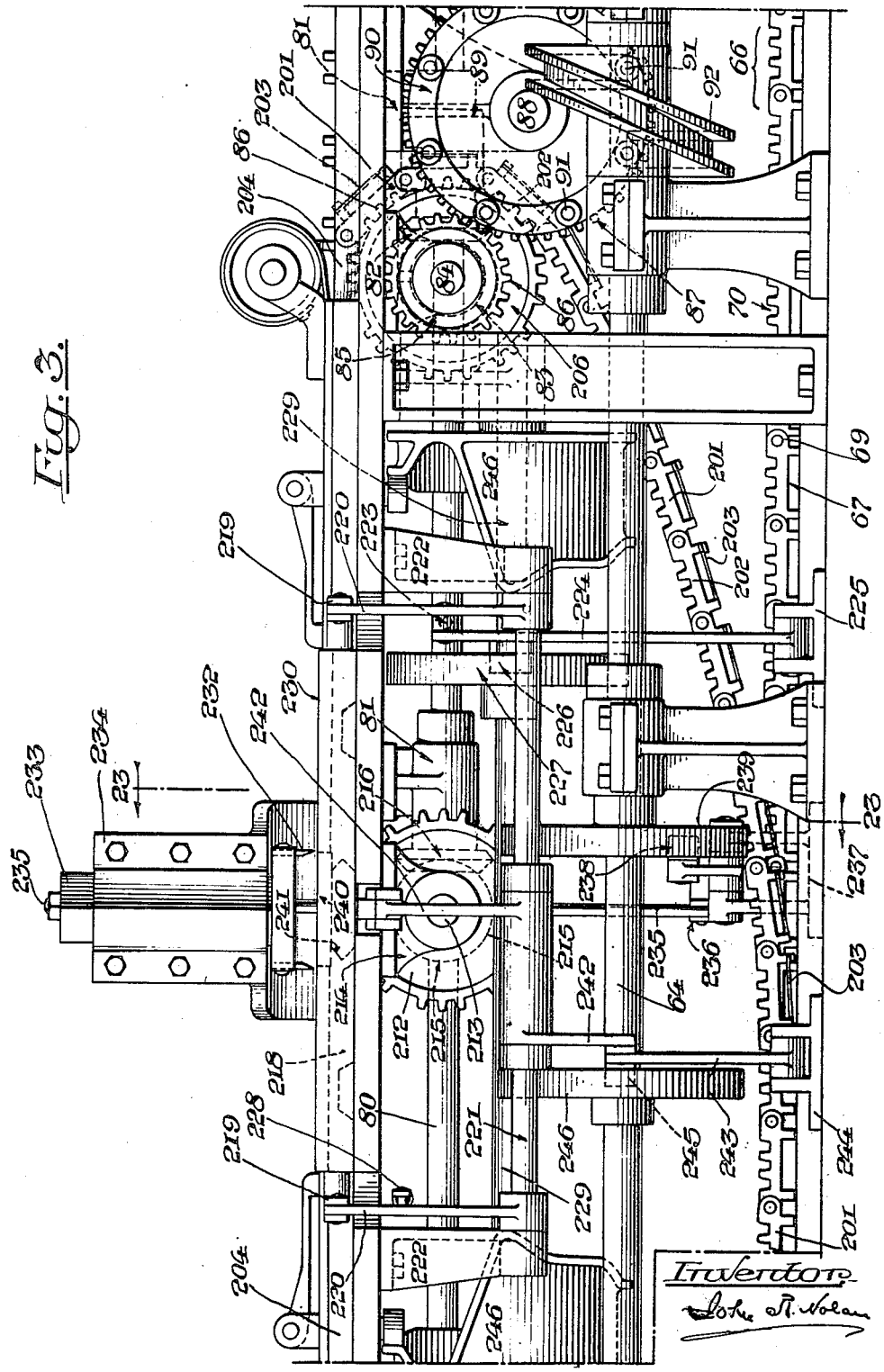
Figure 4:
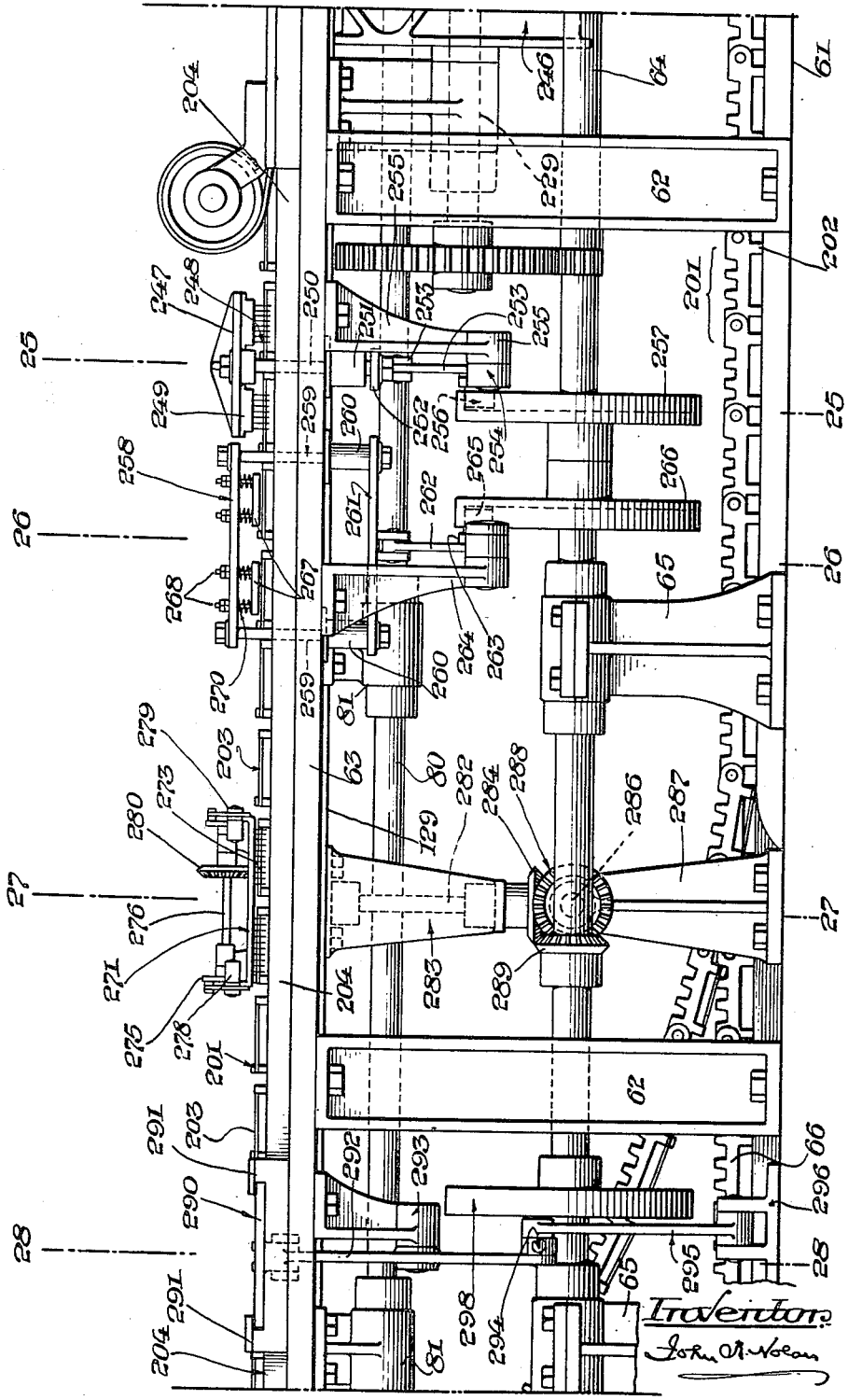

Figs. 35 to 42, inclusive, are sectional details of longitudinally extending folding devices for the respective ends of each cover strip during its advance by the cover conveyer, showing the progressive stages of folding, and also the downward deflection of the forward portion of the cover from a horizontal to a vertical plane, as on the lines 35 to 42, respectively, of Figs. 1 and 2.

Figure 5:
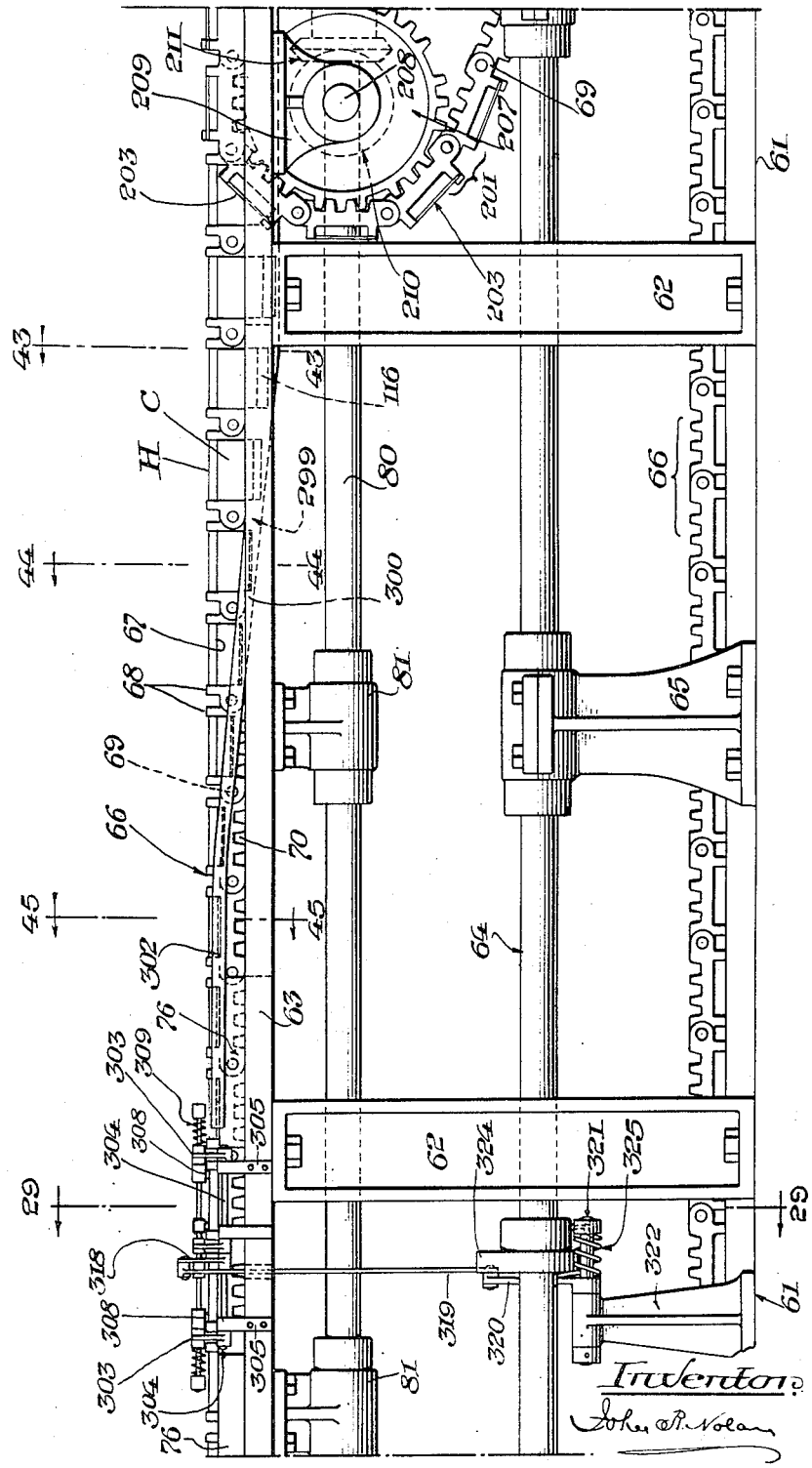

Figs. 43, 44 and 45 are similar details of the devices for progressively returning the forward portion of the cover to the horizontal, as on the lines 43 to 45, respectively, of Fig. 5.

Fig. 46 is a detail in plan of adjacent portions of the cover and match conveyers, showing complementary covers and match holders in the cover conveyer, one of the holders being partly in section, and also showing match cards in the match conveyer.

Fig. 47 is a front elevation of one of the pocketed links of the match conveyer, showing a card of matches therein.

Fig. 48 is a similar elevation, partly in section, of one of the links of the cover conveyer, showing an associated cover and match holder therein.

Fig. 49 is a transverse vertical section through the two conveyers, as on the line 49—49 of Fig. 46.

Fig. 50 is a detail, in section, through the conveyers and the reciprocating cutter head for cutting the margins of the match strips.

Fig. 51 is a front elevation of a portion of the match conveyer and the cutter head.

Fig. 52 is a transverse vertical section through the cutter head and the adjacent links of the match conveyer, as on the line 52—52 of Fig. 50.

Fig. 53 is a detail, in cross-section, of a link of the match conveyer together with the presser for the heads of the matches.

Fig. 54 is a longitudinal vertical section, as on the line 54—54 of Fig. 53.

Fig. 55 is a transverse vertical section through the cover and match conveyers, showing the mechanism for parallelly spacing the matches.

Figure 10:
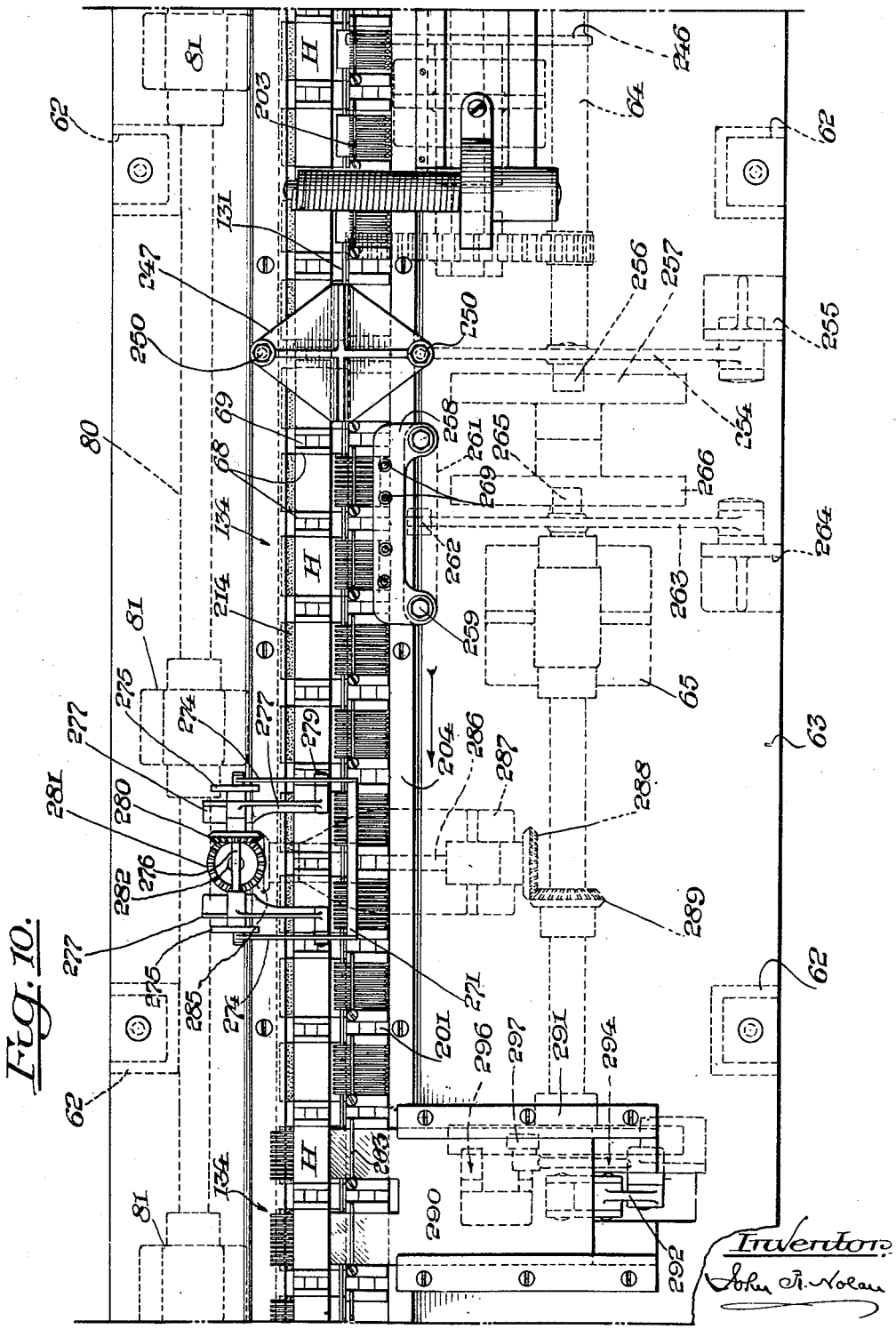
Figure 11:
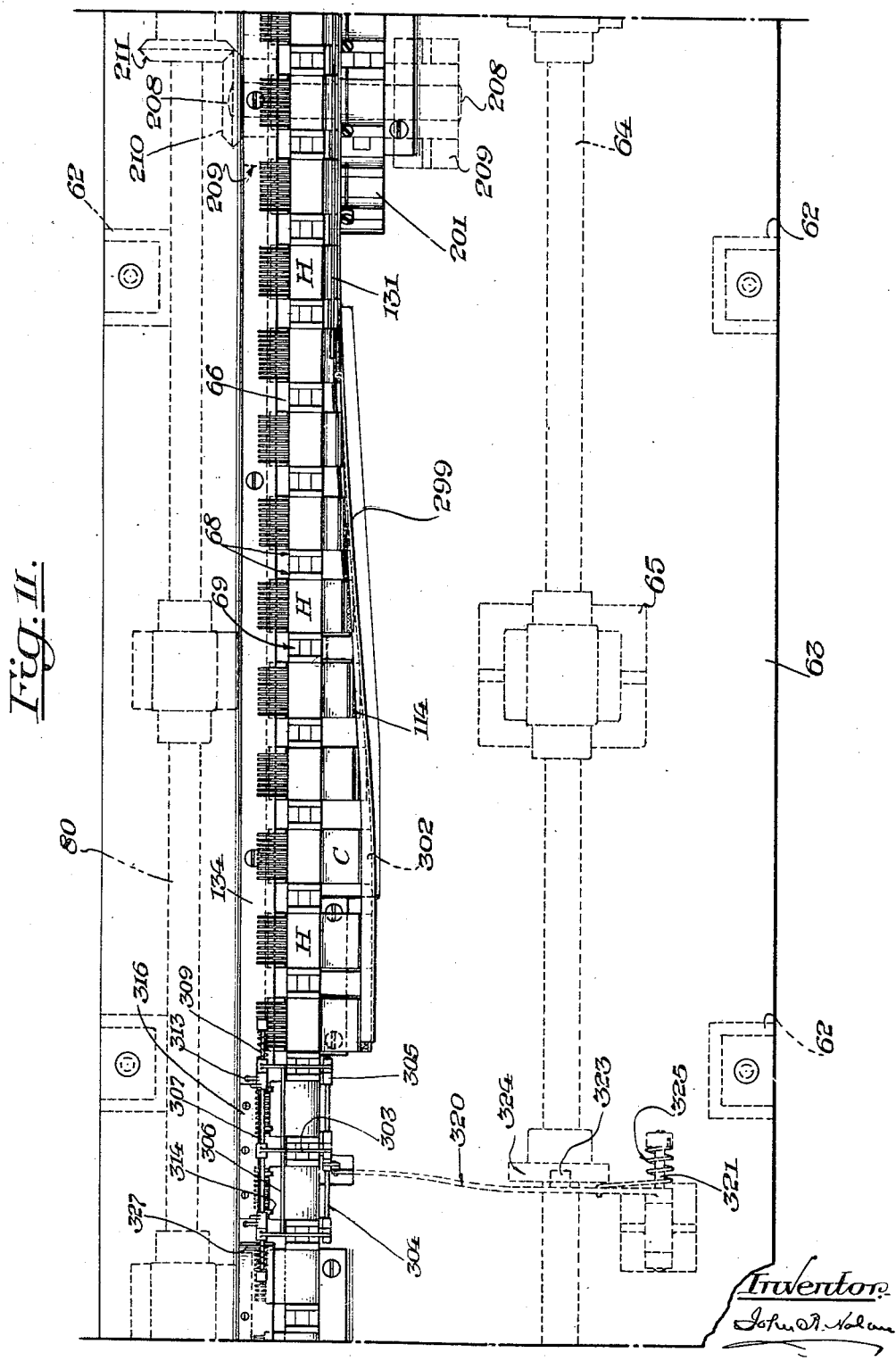
Figure 56:
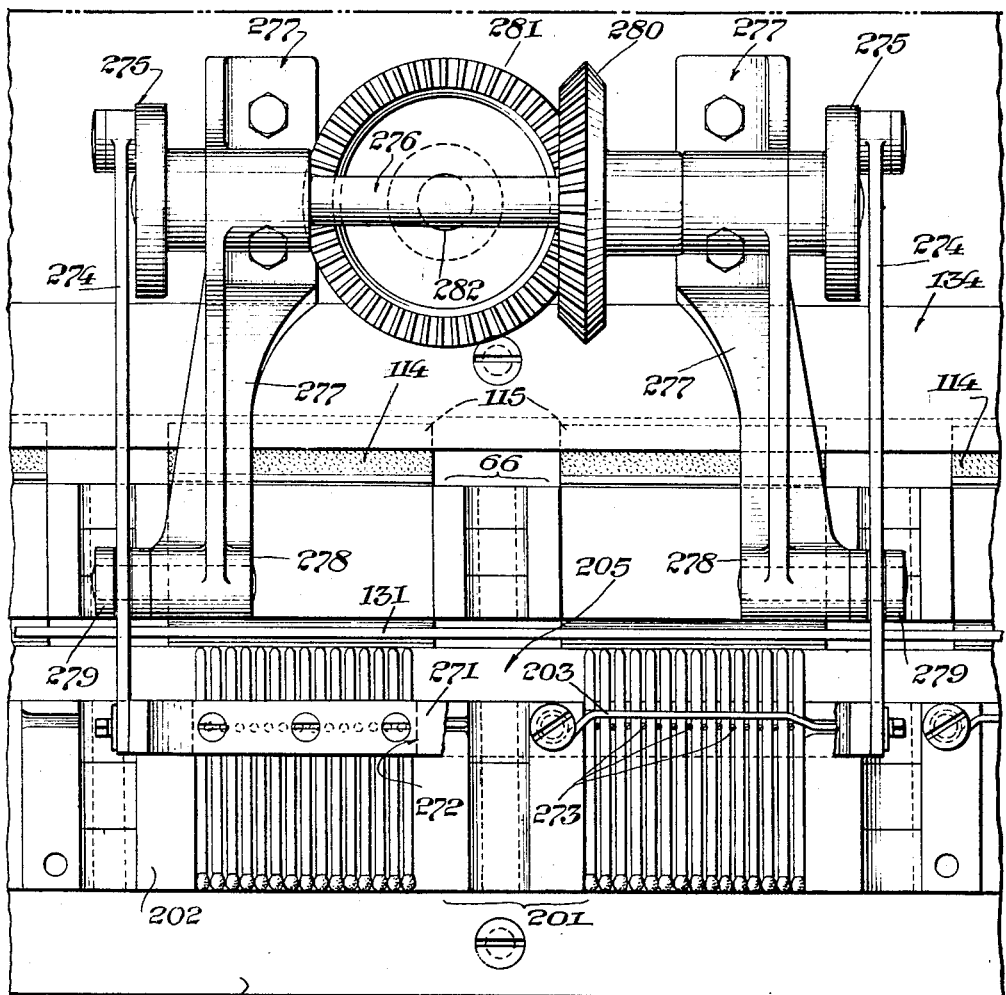

Fig. 56 is a plan, enlarged, of the mechanism shown in Fig. 10 for parallelly spacing the stems.

Figure 57:
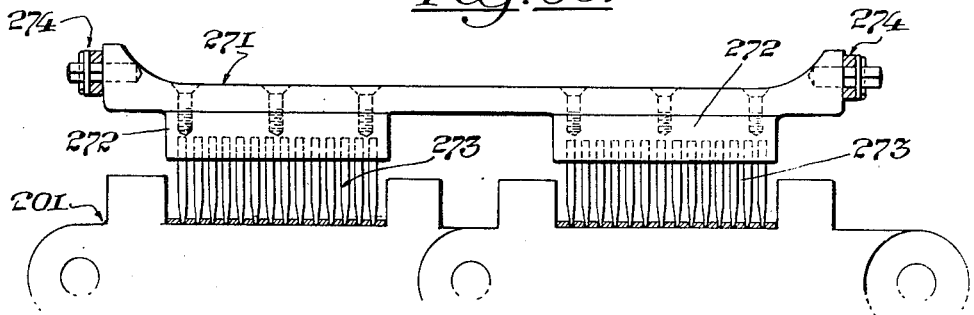

Fig. 57 is an elevation of comb devices for spacing the match stems, which stems are shown in section as supported on the links of the match conveyer.

Fig. 58 is a plan, enlarged, of the mechanism shown in Fig. 10 for inserting the groups of match stems in the holders borne by the cover conveyer.

Fig. 59 is a transverse vertical section, as on the line 59—59 of Fig. 58.

Referring to the drawings, 60 designates a suitable supporting frame comprising a bed 61, standards 62 and a table 63. A power driven shaft 64 extends longitudinally of the machine, at the front of the supporting frame, and has its bearings in suitably-disposed stands 65 on the bed.

66 designates a conveyer comprising an endless chain of links each constituting a cover holder. Each link consists of a flat body 67 having side walls 68 spaced to receive between them a cover strip (C) extending transversely of the body, such body also having hinge lugs 69 at its ends and gear teeth 70 on its underside. The upper surface of the body is preferably downwardly inclined at the rear of the link, as at 71, in order to permit a slight downward inclination of the rearward end of the cover strip, as will presently appear.

The conveyer 66 is flexed about two sprocket wheels 72 and 73 which mesh with the teeth of the cover holders. These wheels are fast on suitably disposed transverse shafts 74 and 75, and the upper horizontal run of the conveyer is arranged to travel in a longitudinal guide-way formed between spaced parallel bars 76 on the table. The shafts 74 and 75, which are journaled in suitably located hangers 77 depending from the table, are intermittently rotated in a manner to impel the conveyer uniformly step-by-step and present the links of the upper run thereof in proper order to various coordinated instrumentalities hereinafter described. In the machine illustrated each step of the conveyer is equal to the length of two links, efficient motion transmitting mechanism therefor being as follows, reference being had to Figs. 1, 2, 3, 5, 7, 9 and 11 of the drawings:

Fast on the rear end of each of the transverse shafts is a bevel gear 78 in mesh with a similar gear 79 fast on a shaft 80 which, extending longitudinally of and below the table, is journaled in hangers 81 depending from the table.

The shaft 80 has fast thereon, between its ends, a bevel gear 82 which meshes with a similar gear 83 fast on a transverse shaft 84 journaled in hangers 85 depending from the table. Also fast on the shaft 84 is a gear wheel 86 in mesh with a larger gear wheel 87 fast on a lower transverse shaft 88 journaled in hangers 89 depending from the table, which latter shaft carries a pin wheel 90 with the pins 91 of which co-act a worm cam wheel 92 fast on the main shaft 64. The contour of the cam and the spaced relation of the pins are such that in one half rotation of the cam the pin wheel is locked and in the next half rotation of the cam the pin wheel is impelled, the ratio of the gearing between the pin wheel and the sprocket wheels 72 and 73 being such that in each movement of the pin wheel the conveyer 66 is moved to the extent of two links, as previously mentioned.

During the intermittent travel of the upper run of the cover conveyer, cover strips (C) are inserted flatwise in the pockets of each succeeding pair of links at the receiving end of the conveyer, the means illustrated for this purpose being as follows, reference being had to Figs. 1, 7, 13, 14 and 15.

Supported on the table 63 are two adjacent hoppers 93, open at the bottom. Each hopper is adapted to contain a pile of cover strips C, which pile is supported above and across the path of the conveyer 66 by means of outwardly yielding spring latches 94 which are secured to the respective sides of the hopper and normally underlie the adjacent lower edges of the pile.

Beneath the pile of strips contained in each hopper are two suction heads 95 which, flanking the path of the conveyer 66, are vertically movable toward and from the lowermost strip of the adjacent pile in a manner to withdraw such strip and deposit it flatwise in and transversely of the underlying link while the conveyer is at rest. The respective suction heads for the two hoppers are mounted and arranged to operate as a unit, and to this end the heads are supported on vertical arms 96 which are freely movable through openings 97 in the table. These arms rise from a base 98 having depending pins 99 which are slidably fitted in guide brackets 100 depending from the table, and the respective heads 95 are connected by conduits 101 to a lower central connection 102 having a flexible pipe 103 operatively connected with a suitable air exhaust or suction device. The base 98 is pivotally connected by means of a link 104 to one end of a lever 105 having its fulcrum on a hanger 106 depending from the table 63, which lever bears a lateral roll 107 operatively fitted in the groove of a face cam 108 fast on the main shaft. The contour of the cam groove is such that the structure supporting the suction heads is raised and lowered in timed relation to the intermittently moving conveyer so that in each dwell of the conveyer the two lowermost cover strips contained in the respective hoppers are downwardly withdrawn therefrom by the suction heads and deposited thereby in and transversely of the two links which are positioned beneath the hoppers. The position of the conveyer links in relation to the hoppers is such that the transverse median line of the cover strip positioned in each link is at the forward side of the link, or approximately so, thus presenting at such side a longer projection of the cover strip than is presented at the rear of the link. (See Figs. 13 and 14.)

As the carrier intermittently progresses each succeeding pair of links are similarly supplied with cover strips and such strips are advanced with their projecting ends resting horizontally, or substantially so, upon the guide bars 76, the longer ends of the strips also overhanging a broad supporting section 109 of the bar 76. The cover strips as they leave the hoppers pass under and project outwardly beyond a pair of elongated mandrels 110 (Figs. 7, 13, 16 and 35) having their outer longitudinal edges rounded, as at 111. These mandrels, which extend in spaced parallel relation to the upper surfaces of the adjacent guide bars 76 are secured at one end to a crossbar 112 on the inner hopper 93 and are also firmly supported by suitably disposed goose-neck brackets 113 on the table. While the conveyer progresses the outer projecting ends of the cover strips (pre-coated with ignition material 114) are bent over and upon the adjacent mandrels so as to produce resilient end folds 115 and 116, respectively, having ignition material on their upper surfaces.

The means herein illustrated (Figs. 1, 7 and 16) for folding the outer ends of the covers during their progress comprises a U-shaped vertically-movable cross head 117 mounted a suitable distance beyond the hoppers and below the upper run of the cover conveyer. The upstanding legs 118 of the head are reciprocative through the paths of the projecting ends of two adjacent cover strips on the conveyer during each dwell of the latter, thus ironing such ends upward, (as at a and b) and against the outer rounded edges of the respective mandrels without rupturing the fibers of the cover material.

In the present instance, the ironing head 117 is connected by a link 119 to a lever 120 which is fulcrumed on a hanger 121 depending from the forward part of the table, and is provided with a lateral roll 122 operatively fitted in the groove of a face cam 123 fast on the main shaft 64, the contour of the groove being such that the head is reciprocated in timed relation to the cover conveyer.

As the conveyer continues its intermittent travel the upstanding ends of the cover strips C encounter two longitudinally extending folding members 124 and 125 which function to fold the ends over upon the respective mandrels. The forward member 124 comprises a plate suitably supported on the table 63. This plate extends flatwise, as at 126, longitudinally of the upper run of the conveyer, and then twists gradually downwardly and inwardly through an arc of about 90° (as seen in Figs. 35 to 42, inclusive), so that its extremity is positioned vertically below the forward side of the conveyer, the table being longitudinally slotted, as at 127, to accommodate the twisted folding plate. The vertically disposed end of the plate aligns with and enters a relatively long narrow slot 128 constituting a contracted continuation of the slot 127. The outer longitudinal edge of the plate 124 is bent upwardly and inwardly to provide a narrow fold channel 129 which extends from a point on its flat portion 126 to its vertically-disposed extremity. The receiving end of the channel is flared and beveled, as at 130, in the path of the advancing upstanding bends a of the cover strips, which bends thus engage the opposing channel end and are progressively folded thereby upon the top of the adjacent mandrel. In the continued travel of the conveyer the outer projecting portions of the cover strips and their end folds 115 and 116 are gradually bent downward until they assume a vertical plane in horizontal alignment with the longitudinal slot 128 of the table, the walls of which slot constitute, in effect, a continuation of the fold channel 129. A wire 131 extending throughout substantially the length of and slightly spaced forwardly from the twisted front surface of the plate, contributes to the efficient downward bending of the forwardly projecting portions of the cover strips. This wire is fixed at its respective ends to the table.

The rearward folding member 125 comprises a fixed plate extending longitudinally of the table adjacent the rear of the upper run of the conveyer, and being parallel with and longer than the horizontal portion of the fold channel 129 of the companion member 124. The forward edge of the plate 125 is provided throughout its length with a folding flange 132 having its receiving end flared and beveled, as at 133, similarly to the receiving end of the channel portion 129. The beveled end of the folding flange 132 is arranged and adapted to be engaged by the rearward upstanding bends b of the advancing cover strips, thus progressively folding such bends upon the adjacent mandrel 110 concurrently with the folding of the bends a on the opposite ends of the respective cover strips. The folding flange 132 leads to and forms in effect a continuation of a grooved or channeled bar 134 on the table, which bar is arranged on the guide bar 76 and extends a substantial distance parallelly with the upper run of the conveyer, and hence during the progression of the conveyer the rearward folds 115 of the cover strips travel in the channel of the bar 134 and are thereby maintained in folded condition until they reach and pass the final folding mechanism for the forwardly projecting portions of the cover strips, as hereinafter described.

The end folded cover strips with their depending forward portions are advanced pair by pair to a location where match holders are inserted in two adjacent conveyer links and upon the respective cover strips. Each of these match holders preferably comprises a flat section of material—as, for example, corrugated paperboard—having a row of parallel match receiving channels, which section is snugly positioned in a link with the channels extending transversely of the link and longitudinally of the associated cover strip.

The means herein illustrated (Figs. 2, 8 and 17 to 21, inclusive) for supplying the channeled cover holders and entering them in the conveyer links comprises two vertical hoppers 135 supported upon the forward part of the table 63 in spaced relation to each other and to the upper run of the conveyer. Each hopper is of proper form and size to receive a pile of superposed strips S of corrugated material, each strip being of proper dimensions for severance transversely into a series of uniform sections suitable for match holders.

At the bottom of the inner wall of each of the hoppers is a slot or opening 136 for the free exit, flatwise, of each succeeding lowermost holder strip resting on the bottom of the hopper. This bottom is constituted by the forward end of a horizontally reciprocative feed plate 137 which is slidable in parallel guideways 138 in a bed plate 139 which is fast on the table. The rearward end of the feed plate 137 is in close relation to a track 140 formed on or constituting a part of the bed-plate 139. The track 140 is provided with a series of forwardly extending fingers 141 which freely register with corresponding slots 142 in the rearward end of the feed-plate, thus bridging the space between the track and plate during the forward strokes of the latter. The upper surface of the feed plate is in the same horizontal plane as that of the track 140 and is provided with a series of equally spaced shoulders 143 which are parallel with each other and with the upper run of the conveyer, the rearmost shoulder being interrupted at intervals by the slots 142, as seen in Fig. 19.

In the reciprocations of the feed plate 137 toward and from the track 140 the foremost shoulder 143 ejects the opposing holder strips S successively through the slot 136 of the hopper, and the other shoulders successively engage each ejected strip and move it rearward to and upon the strip supporting track.

Overhanging the feed plate, and in the same spaced relation as the shoulders thereof, are a series of rows of rearwardly and downwardly inclined spring pawls 144 having angular feet 145 which are adapted to engage the upper forward edges of the respective holder strips when they are intermittently moved by the shoulders of the feed plate, thus preventing the retrograde movement of such strips during the forward or return strokes of the plate.

In the present instance one row of pawls 144 is secured to the inner wall of the hopper and the remaining rows are secured in succession to a skeleton frame structure 146 which is supported by the hopper and the guide members 138.

As each holder strip is positioned on the track 140 adjacent the conveyer, such strip is longitudinally advanced step-by-step along the track, each step being equal to the length of a match holder. In each succeeding dwell of the strip a section H is cut from the leading end of the strip and immediately inserted in a link of the conveyer during a dwell of the latter, as will be hereinafter described. When the strip, which is positioned on the track has been fully subdivided, the next succeeding strip is positioned on such track by the feed plate, and so on during the continued operation of the machine.

In the present instance the means for reciprocating the feed plate 137 comprises an upstanding lever 147 which is fulcrumed at its lower end in a bracket 148 on the bed of the main frame, and is pivotally connected at its upper end by means of a link 149 to the lower arm of a lever 150 which is fulcrumed on a hanger 151 depending from the table. (See Figs. 2 and 22.) The upper arm of the lever 150 is connected by means of a link with the feed plate, and the lever 147 is provided with a roll 152 which is operatively fitted in the groove of a face cam 153 fast on a supplemental shaft 154 parallel with the main shaft. The shaft 154 has its bearings in stands 155 on the frame bed 61, and is provided with a spur gear 156 in mesh with a pinion 157 on the main shaft, the ratio of the gearing being determined by the length of a holder strip and the number of match holders to be severed therefrom. The contour of the cam groove is such that the feed plate is reciprocated through the connections described in timed relation to the conveyer.

The means illustrated for intermittently feeding the holder strip along the track 140 comprises a reciprocating pawl arm 158 which extends longitudinally of and overhangs the track, and is given a determined rising and falling motion during its reciprocation. One end of this arm is pivoted to a crank disk 159 which is fast on one end of a short transverse shaft 160 journaled in a bearing bracket 161 rising from the table, whereby during the rotation of the disk the arm 158 is longitudinally reciprocated. The free end of the arm 158 overhangs the track 140 and is provided with a foot 162 having a depending pin 163. A roll 164 mounted on a suitably-disposed post 165 on the table underlies and temporarily supports the midsection of the pawl arm, so that such arm during its longitudinal motion is oscillated in a manner to engage the pin with and disengage it from the opposing surface of the underlying holder strip at determined intervals. That is to say, when in the clockwise rotation of the crank disk the pivotal connection of the arm therewith is in its lowest position, the arm is riding upon the roll, the forward end of the arm is in raised position and the pin is above and disengaged from the holder strip; as the disk continues its rotation the arm is gradually moved to a horizontal position and the point of the pin is engaged with the surface of the strip; as the rotation of the disk continues the arm moves in contact with the roll and the pin remains in engagement with the holder strip, thus advancing the strip a distance equal to the width of a match holder, and in the final rotative movement of the disk the arm, resting on the roll, is tilted to lift the pin from engagement with the holder strip preparatory to a repetition of the feeding action.

In the present instance the shaft 160 has fast thereon a bevel gear 166 in mesh with a similar gear 167 on the upper end of a vertical shaft 168 journaled in a hanger 169 depending from the table. The lower end of the shaft 168 has also fast thereon a bevel gear 170 in mesh with a similar gear 171 on the main shaft. The gearing is such that the crank disk shaft 160 is rotated correspondingly with the main shaft, and the eccentricity of the crank connection and its co-operative relation to the roll 164 are such that during each succeeding step of the conveyer the pin 163 of the pawl arm 158 engages the opposing holder strip and advances it the determined distance, and that during each dwell of the conveyer the pin 163 is disengaged from the strip and returned to its initial position for engagement with a succeeding portion of the strip.

Holder strips S from the respective hoppers 135 are simultaneously positioned upon the adjacent tracks 140 and in longitudinal alignment with each other, and the two strips thus disposed and supported are simultaneously moved endwise toward each other so that their leading ends present corresponding projecting portions which are properly located in front of two adjacent conveyer links during each dwell of the conveyer. The leading ends of the intermittently moving holder strips abut a stop 172 comprising a block fast on the table midway between two adjoining links during each dwell of the conveyer. On this block is fixed a plate 173 which overhangs each of such leading ends to an extent substantially equal to the width of a holder section. Also overhanging the holder strips in slightly spaced relation to the respective ends of the block 172 are longitudinally slotted plates 174 through the slots 175 of which freely depend the pins 163 of the respective pawl arms 158, said plates 174 being supported by the rearward end of the bed plate 139. (Figs. 17 and 19.)

The plates 173 and 174 and the adjacent surfaces of the track 140 provide steadying and guiding means for the leading ends of the holder strips during their intermittent movement, and also for the end sections when they are severed to provide match holders, as hereinafter described.

Duplicate mechanisms are employed for feeding the succeeding strips from the respective hoppers 135 to and upon the track 140, and also for feeding the strips therealong, and therefore corresponding reference characters are used to designate the like parts of such mechanisms.

The means herein illustrated (Figs. 8, 20 and 21) for rapidly and simultaneously severing the leading projecting ends of the two holder strips imposed on the track 140, so as to provide two adjacent match holders, comprises two spaced rotary cutters 176 fast on an arbor 177 overhanging the paths of the leading ends of the holder strips. These cutters are in vertical alignment with the respective spaces at the ends of the plates 173 and 174. The arbor has its bearings in the free forward ends of the side bars of a rock frame 178 which is loose at its rearward end on a longitudinal shaft 179 journaled in brackets 180 on the table 63.

Fixed on the shaft 179 is a pulley 181 which is connected by means of a belt 182 with a pulley 183 fast on the arbor. The shaft 179 is driven by a small electric motor 184 conveniently mounted on the table. Thus the arbor and its cutters are continuously driven at high speed, irrespective of the inclination of the rock frame.

Fast on the main shaft is a face cam 185 in the groove of which is operatively fitted a lateral roll 186 on a lever 187 which is supported by a hanger 188 depending from the table. The rearward end of this lever is pivotally connected by a link 189 with the rock frame 178, and the contour of the cam groove is such that such frame is rapidly lowered and raised at an interval in the dwell of the conveyer when the leading ends of the holder strips have been projected, the two cutters in their descent severing such projecting ends and being returned to their raised position in readiness for a similar severing operation on the next succeeding projecting ends of the holder strips during a dwell of the conveyer.

When in each succeeding operation of the cutters the two match holders have been severed from the respective holder strips such holders are immediately pushed transversely of the track 140 and into the two adjacent conveyer links in alignment therewith, thus being superposed on the bodies of the cover strips borne by the links, as will presently appear.

In the final severing operation by the cutters on the trailing end of each of the two intermittently moving holder strips on the track 140, two match holders are produced, one being positioned against the stop 172 and under the plate 173, and the other being positioned under the adjacent plate 174 and out of the way of the next succeeding holder strip as it is moved to and on the track 140 by the reciprocating feed plate 137. The latter strip in its initial longitudinal movement on the track pushes the opposing match holder against the stop 172, and, therefore, at this juncture the abutting ends of the holder strip and match holder are in vertical alignment with the adjacent cutter. Consequently, the cutter in its next reciprocation passes idly between such abutting ends, and the leading end of the strip in its next succeeding movement abuts the stop and is in proper position to be initially severed by the cutter.

The means illustrated (Figs. 2, 8, 20 and 21) for moving each succeeding pair of match holders from the track 140 and inserting them in adjacent links of the conveyer, comprises a pusher 190 which is slidably mounted in suitably disposed horizontal guides 191 on the front of the table. The pusher includes a bifurcated plate, the members 192 of which are spaced correspondingly with the two severed match holders and are reciprocable transversely of the track 140 so that in the rearward stroke of the plate such members impinge against the opposing match holders and enter them forcibly in the two adjacent links. The holders are frictionally held between the walls of the respective links, and thus remain therein during the retraction of the plate.

In the present instance the pusher plate 190 is actuated from a face cam 193 on the main shaft, the groove of which cam receives a lateral roll 194 on an upstanding arm 195 which is fulcrumed on a bracket 196 on the bed. This arm is pivotally connected by means of a link 197 to one arm of a lever 198 which is fulcrumed on a hanger 199 depending from the table, the other arm of the lever being linked to the pusher plate 190. The contour of the cam groove is such that during each dwell of the conveyer the arm 195 and lever 198 are oscillated to effect the reciprocation of the pusher in timed relation to the cutters.

The rear or acting ends of the pusher members 190 are provided respectively with rows of conical studs 200 which are arranged in the same spaced relation as the series of parallel channels of the opposing holders and in alignment centrally with the respective channels, so that in each rearward or active stroke of the pusher 190 the studs 200 enter and centralize the mouths of the respective channels in a manner to ensure the free passage of the matches endwise into the channels, as will presently appear.

In the continued progress of the conveyer 66 the links carrying the cover strips and their associated match holders are presented successively in pairs to the action of mechanism whereby rows of individual matches are inserted endwise in the channels of the respective match holders. In the present instance each match card provides a series of matches for simultaneous insertion in a single match holder. Preceding the match inserting operation are mechanisms which are arranged in succeeding order for supplying long match strips and subdividing them into match cards; then subdividing the cards into rows of individual matches, and then spacing the matches of each row in parallelism, as will now be described.

201 designates a relatively short conveyer, termed a match conveyer, comprising an endless chain of links 202 generally similar in construction to the links of the conveyer 66, save that the pocket of each link 202 is provided with a resilient pressure element 203 which directly overhangs the bottom of the pocket adjacent the rear of the link. In the present instance this pressure element comprises a wire bent into hair-pin formation and secured at one of its free ends to one of the side walls of the link, as seen in Figs. 46, 47 and 49. The upper run of the conveyer 201 is mounted and arranged to travel on the table in front of and parallel with the upper run of the cover conveyer, being guided in its travel by spaced bars 204 and 205 on the table. The conveyer 201 is intermittently movable correspondingly with and in the same direction as the cover conveyer to the end that the pockets of the adjacent links of the respective upper runs of the conveyers will travel concurrently and in alignment with each other. The match conveyer 201 is flexed about two spaced apart sprocket wheels 206 and 207, the wheel 206 being fast on the transverse driven shaft 84 for the conveyer 66, and the wheel 207 being fast on a transverse shaft 208 journaled in hangers 209 depending from the table at a position beyond the match inserting station. The shaft 208 has fast thereon a bevel gear 210 in mesh with a similar gear 211 on the longitudinally-extending driven shaft 80, and the gearing is such that the motion is transmitted to the match conveyer in timed relation to the cover conveyer.

In order to insure the mating positions of the adjacent links of the upper runs of the two conveyers, a series of sprocket wheels 212 are mounted on suitably arranged shafts 213 so as to mesh with the teeth of such links at spaced intervals, which shafts 213 are journaled in hangers 214 and bear bevel gears 215 in mesh with similar gears 216 on the longitudinal shaft 80.

The receiving end of the upper run of the match conveyer 201 progresses in proximity to mechanism (Figs. 3, 9, 23 and 24) for subdividing long match strips M into match cards and inserting two cards flatwise into two adjacent links, with the uncut bases of the cards resting on a base block 217 fixed on the table directly in front of the match conveyer. The mechanism herein selected for this purpose is of known construction and operation, being generally similar to that disclosed in the Paridon et al. Patent No. 1,042,472, dated October 29, 1912. The construction so far as it is illustrated comprises a longitudinal guide formed in a base block 217 and adapted to receive full length match strips in end spaced relation. A transverse bifurcated plunger 218, which is slidably mounted on the base block 217, is connected at its respective ends by links 219, with the upper ends of two spaced arms 220 the lower ends of which are fast on a shaft 221 journaled in hangers 222 supported by the table 63. One of the arms is pivotally connected by means of a link 223 to an upstanding lever 224 having its fulcrum on a bracket 225 on the bed 61, which lever has a roll 226 yieldingly held in contact with a face cam 227 by means of a suitably-disposed spring 228. The cam is fast on a short shaft 229 parallel to the main shaft 64 and is driven from the latter shaft through a suitable gear train, so as to be driven at a determined lower speed than the main shaft, as heretofore. (See Figs. 3, 23 and 24). The contour of the cam groove is such that at a proper interval in its rotation the plunger 218 is moved forward against the action of the spring and is then retracted by the latter, thus reciprocating the plunger. A cover plate 230, constituting a supplemental table, overhangs the path of the plunger 218 in spaced relation to the conveyer, so that when the plunger is in its rearward position match strips, heads trailing, can be placed thereon. This done, when the plunger travels beneath such table and away from the match strips, the strips fall flatwise upon the base block 217, whereupon in the next succeeding active stroke of the plunger, the opposing match strips are pushed toward the conveyer with their butts against guides 231 on the base block and their uncut bases directly under reciprocating spaced-apart cutters 232 depending from a vertical plunger 233 slidably mounted in a guide structure 234 supported on the table.

The cutter plunger 233 has a depending actuating rod 235 which is pivotally connected to a lever 236 having its fulcrum on a bracket 237 on the bed, and also having a roll 238 which is fitted in the race of a cam 239 fast on the main shaft 64. The contour of the cam race is such as to effect the timed reciprocation of the cutter plunger in order to sever the match strips into conventional match cards. These cards as they are produced are pushed by means of a supplemental transverse plunger 240 into the pair of adjacent links of the match conveyer. The card setting plunger 240 is carried by a slide 241 which is mounted within the feed-table and is jointed to the upper end of a lever 242 which is loose at its lower end on the shaft 221. The lower end of the lever 242 is pivotally jointed to an upstanding lever 243 having its fulcrum on a bracket 244 on the bed.

The lever 243 is provided with a roll 245 operatively fitted in the race of a cam 246 fast on the main shaft 64, the contour of which race is such that the timed reciprocation of the card setting plunger 240 is effected through the connections just described.

By suitable operating connections, including cams 246 fast on the driven shaft 229, the match strips (M) when they are positioned against the guides 231 on the base block 217 are advanced at intervals longitudinally of the main table and beneath the cutting mechanism preparatory to the cutting of succeeding cards from the strips, all as fully shown and described in Patent No. 1,042,472 aforesaid. The strips may, if desired, be automatically fed in an orderly manner to the supplemental table 230 by conveyer mechanism such, for example, as disclosed in the Paridon Patent No. 1,461,433 dated July 10, 1923.

When the match cards are pushed into the links of the match conveyer 201 by the plunger 240 the bases of the cards pass under and beyond the spring pressure members 203 of the respective links, thus overlying and resting upon the upper surface of the adjacent longitudinal guide-bar 205 for the conveyer. The pressure members, bearing upon the stems of the matches adjacent the uncut base portions, yieldingly clamp the cards in the respective links. The match cards thus held are advanced by the conveyer 201 to suitably-located mechanism for subdividing the bases of the cards longitudinally of the matches in lines extending from the parallel cuts which define the width of the match stems, which mechanism in the form illustrated (Figs. 4, 10, 25, 50, 51 and 52) embodies a vertically-reciprocative cutter head 247 extending longitudinally of the conveyers and having two rows of depending cutter blades 248 which overhang the guide bar 205 and the bases of the two match cards which are to be subdivided. The cutter head includes a body to the underside of which are secured in spaced-endwise relation two blocks 249, each provided with a row of depending cutter blades 248 arranged in spaced parallel relation correspondingly with the longitudinal cuts defining the width of the match stems. The cutting edge of each of the blades of a row is equal to the width of a match card base, and hence when the cutter head is vertically reciprocated the two rows of blades, in their descent, sever the opposing bases of the respective match cards, thus subdividing the cards into two groups of individual matches. The spring members 203 by their action on the respective groups of match stems not only retain the matches in place in the links, but they also serve as strippers for the matches during the up-stroke of the cutters.

In the present instance the body of the cutter head 247 is supported by depending rods 250 which are slidably fitted in guides 251 depending from the table and which rods are supported by a foot plate 252 underlying the table. This plate is connected by a link 253 to a lever 254 which is fulcrumed on a hanger 255 depending from the forward portion of the table 63, and is provided with a lateral roll 256 operatively fitted in the groove of a face cam 257 fast on the main shaft 64. The contour of the cam groove is such that when a pair of match cards are positioned with their bases beneath the cutters, the lever is actuated to lower the cutter head and effect the requisite severance of the card bases, and is then raised preparatory to a similar operation on the next succeeding pair of match cards; and so on during the intermittent travel of the match conveyer.

As the two juxtaposed conveyers continue their intermittent progress along the table the links of the match conveyer containing the severed matches are presented to mechanism whereby during a dwell of the conveyers the heads of the upper series of matches in each link of the match conveyer are moved to the same horizontal plane as the contiguous series of match heads. This mechanism (Figs. 4, 10, 26, 53 and 54) includes a longitudinally extending head bar 258 which overhangs the forward ends of two adjoining links of the match conveyer, being supported by vertical guide rods 259 which, similarly to the rods 250, are fitted in guides 260 under the table and are supported by a foot piece 261, which, in turn, is connected by a link 262 to a lever 263 having its fulcrum on a hanger 264 depending from the table 63. The lever 263 has a lateral roll 265 operatively fitted in the groove of a suitable face cam 266 fast on the main shaft 64, the contour of the groove being such as to lower and raise the head bar 258 at a determined interval in each rotation of the cam. Underlying the head bar 258 and in parallelism therewith are two presser bars 267 which are arranged to enter and recede from the pockets of the respective links of the match conveyer during the reciprocation of the head bar. The presser bars 267 are resiliently movable in relation to the head bar, and are so arranged that in their downward stroke they bear yieldingly upon the opposing heads of the upper series of matches in a manner to move them down between and in alternation with the contiguous lower series of match heads. This done, the heads of the lower series of matches of each row of matches are spread and the heads of the end matches are in contact with the opposing side walls of their supporting link. By virtue of their enlarged head portions the match stems converge rearwardly to the severed base portion and are yieldingly held in place by the pressure of the spring member. In the present instance each of the presser bars 267 has two spaced upstanding pins 268 which rise through guide holes in the head bar 258 and are provided at their upper ends with adjusting and stop nuts 269.

Interposed between the presser bars 267 and the head bar 258 are springs 270 which encircle the respective pins 268 and exert the requisite resilient action on the presser bars.

As the two conveyers progress the links of the match conveyer containing the converging matches are presented in pairs to mechanism whereby during a dwell of the conveyers the stems of adjacent matches in the respective links of the match conveyer are shifted laterally to spaced parallel relation and in endwise alignment with a corresponding series of channels of the match holders H which are supported over the cover strips in the adjacent links of the cover conveyer 66. This mechanism (Figs. 4, 10, 27, 55, 56 and 57) comprises a bar 271 which extends longitudinally of and above the match conveyer and is given a reciprocating and rising and falling motion similarly to the mechanism hereinbefore described for intermittently feeding the match holder strips to the cutters 176. Secured to the underside of the bar 271 are two combs 272 having rows of depending pins 273 corresponding in number and relation with the interspaces of the match stems in two adjoining links and in proximity to the heads of the matches.

The ends of this bar 271 are secured to the forward ends of two transverse arms 274 which are pivoted to their ends to two corresponding crank disks 275 on the respective ends of a short longitudinally extending driven shaft 276 journaled in bearing brackets 277 suitably-supported on the table, whereby during the rotation of the shaft 276 the arms 274 together with the bar 271 and its combs 272 are reciprocated transversely of the paths of travel of the conveyers. The brackets 277 have forward extensions 278 bearing suitably-disposed lateral rolls 279 which underlie and temporarily support the respective arms 274 so that the latter in their lengthwise motion are vertically oscillated in timed relation to the match conveyer.

In the present instance the shaft 276 has fast thereon a bevel gear 280 in mesh with a similar gear 281 on the upper end of a vertical shaft 282 journaled in a hanger 283 depending from the table 63. The lower end of the shaft 282 has also fast thereon a bevel gear 284 in mesh with a similar gear 285 on the rear end of a lower transverse shaft 286 journaled in a bearing stand 287 on the bed 61. The forward end of the shaft 286 bears a bevel gear 288 in mesh with a similar gear 289 fast on the main shaft. The transmission gearing just described is such that the crank disk shaft 276 is rotated correspondingly with the main shaft.

While the two conveyers are at rest the bar 271 is lowered and the points of the comb pins 273 are entered in the corresponding spaces between the stems adjacent the heads of the matches contained in the respective match conveyer links, as indicated in Fig. 55. In the dwell of the match conveyer the comb pins, resting upon the bottoms of the links, are moved rearwardly in proximity to the respective spring members 203, thus laterally spreading the match stems of the two rows into parallel relation, while their adjacent heads are in pivotal contact with each other, and the heads of the end matches are similarly in contact with the opposing parallel walls of the respective holders, as seen in Fig. 56. This done, the bar 271 and the comb pins are raised, and in the next succeeding step of the conveyers, such bar and combs are moved forward and positioned to engage a succeeding series of matches when the conveyers are at rest. Hence during the intermittent progress of the conveyers the matches contained in the succeeding pairs of links of the match conveyer are arranged in spaced parallel relation by the spreading action of the combs.

The links of the match conveyer containing the rows of parallelly spaced matches are presented in pairs to the path of a horizontally reciprocating pusher which is arranged on the table and in front of the match conveyer, so that in each dwell of the conveyers the pusher in its rearward stroke impinges against the heads of the two opposing rows of matches and pushes them endwise from the match conveyer and into the parallel channels of the respective match holders H which are supported upon the covers C in the adjacent links of the cover conveyer. (See Figs. 4, 10, 28, 58 and 59.) The pusher comprises a plate 290 having a bifurcated rearward portion and being slidably mounted in a guide block 291 supported on the table 63. The rearward members of the plate 290 are spaced and proportioned to enter the two adjacent links of the match conveyer and pass therethrough to the forward edge of the cover conveyer, thus pushing the matches into and through the match holders H to such an extent that the heads of the matches are covered and frictionally held by the walls of the channels at the mouth thereof, and the opposite or handle ends of the match stems project rearwardly of the match holders. By virtue of the hereinbefore described downward and rearward inclination 71 of the upper surfaces of the respective links of the cover conveyer 66, and the level of the channel of the rear bar 134 relatively to the match stems, the rearward ends of the cover strips C are positioned with their resilient folds 115 directly under the protruding stems. (See Fig. 59.)

The heads of the matches in their rearward passage through the links of the match conveyer impinge against the forward lower surfaces of the spring members 203 and cam them upwardly, and the pusher 290, which is slightly beveled at its acting ends, passes under such members and maintains them in raised position until they are freed in the forward or return stroke of the pusher.

As herein illustrated the pusher plate 290 is linked at its upper end to one arm of a lever 292 which is fulcrumed on a hanger 293 depending from the table 63. The other arm of the lever is pivotally connected by a link 294 to an upstanding arm 295 pivoted at its lower end to a bracket 296 on the bed 61. The arm 295 is provided with a suitably-disposed roll 297 which is operatively fitted in the groove of a face cam 298 fast on the main shaft 64, the contour of the groove being such that the pusher 290 is reciprocated in timed relation to the conveyers.

The cover conveyer in its intermittent travel transports the associated covers, match holders and matches to a suitable location beyond the adjacent end of the match conveyer. In this continued travel the rearward folds 115 of the covers are guided horizontally in the adjacent channel bar 134, and the forward depending end folded portions 116 of such covers are gradually swung upwardly to a horizontal plane where they project forwardly of the cover conveyer. This done and the conveyer being at rest, the forwardly projecting portions of two adjoining covers are folded over upon the associated holders and matches in a manner to position the free edges of the end folds 116 in contact with the projecting stems of the respective rows of matches and in close relation to the adjacent ends of the holders.

The means herein illustrated (Figs. 5, 11, 43, 44 and 45) for moving the depending portions of the covers to a horizontal plane comprises a twisted longitudinally channeled plate 299 generally similar in construction but having its ends oppositely-disposed in relation to those of the channeled member 124 previously described for folding and bending down the forwardly projecting portions of the covers as they progress toward the receiving end of the longitudinal slot 128 in the table. That is to say, the vertical end portion of the plate 299 forms a continuation of the slot 128, and the vertically-disposed end of the channel 300 of such plate is in alignment with the vertically-disposed portion of the channel 129 of the member 124. From its vertical end portion the plate 299 is bodily twisted gradually upwardly and outwardly, as at 301, through an arc of about 90°, so that its upper end portion is horizontally disposed, as at 302, and is in longitudinal alignment with the horizontal receiving portion of the channel of the member 124. Hence as the covers progress toward and beyond the adjacent or left hand end of the match conveyer 201, the resilient end folds 116 of the depending portions of the covers enter the channel of the plate 299 and are thereby directed to a horizontal position forwardly of the cover conveyer 66; it being noted that such folds are efficiently guided and controlled in their extended sinuous travel by means of the channels of the respective plate members 129 and 299 and the intervening walls of the longitudinal slot 128 in the table 63.

In the succeeding advancement of the cover strips by the cover conveyer, their forwardly projecting end folded portions 116 are presented to the final folding mechanism. (See Figs. 5, 11 and 29 to 33, inclusive.) This mechanism in the form illustrated includes a fly-frame comprising three spaced angular arms 303 whereof the rearward ends are fast on a rock shaft 304 journaled in upstanding brackets 305 fixed at the forward edge of the table 63 adjacent the cover conveyer; the guide bar 134 at this location being suitably divided into two endwise spaced sections. The arms 303 support adjacent their free ends a tie rod 306 which is parallel with the conveyer. These arms are spaced apart correspondingly with the links, and the rock shaft 304 is so positioned that the arms swing from a nearly horizontal position forwardly of two adjoining conveyer links to a similar position overhanging the respective links. In the outer ends of the arms is journaled a rock shaft 307 in parallelism with the rod 306, on which shaft are fixed two pairs of spaced hooks 308 which are normally maintained in overhanging relation to the outer end of the fly-frame by the action of suitably-disposed torsion springs 309 at the respective ends of the shaft 304. Rearwardly extending toes 310 on the hubs of the hooks co-act with studs 311 on the end arms 303 to determine the normal position of the spring actuated hooks. Upstanding toes 312 on the hubs of the hooks 308 abut suitably-disposed pins 313 on the rear channel bar 134 when the fly-frame is swung over the conveyer links, thus moving the hooks partially rearward against the action of the springs 309.

When the fly-frame is in its forwardly extending position, as seen in Figs. 29 and 30, its relation to the forwardly projecting folded ends 116 of the covers situated in the horizontally-disposed channel portion 302 of the plate 299 is such that in a succeeding movement of the conveyer such folded ends pass upon the rod 306 and beneath the hooks 308, which hooks are arranged and adapted to overhang the forward corners of the respective folds 116 of the two covers, as seen in Fig. 30. In the next succeeding dwell of the conveyer the fly-frame is swung upwardly and rearwardly in a manner to overhang the proximate conveyer links and position the folds 116 of the covers with their free edges immediately rearward of the match holders and in contact with the tops of the rearwardly projecting ends of the respective rows of match stems, as seen in Fig. 31.

As the upper folds 116 of the covers in their downward movement approach the projecting match stems the outer rounded edges of the resilient folds impinge against and press back a series of beveled bolts 314 which are normally projected into the paths of the respective folds. When the edges of the upper folds escape the bolts the forward ends of the latter spring forwardly and over such edges, thus retaining the folds in down position, as seen in Fig. 32. In the present instance the bolts 314 and their rearwardly-extending stems 315 are slidably fitted in transverse guide holes in a short bar 316 which is conveniently fastened on the rearward guide bar 134, and suitably-disposed springs 317, encircling the stems of the respective bolts, maintain the bolts normally projected.

As the upper cover folds 116 engage the bolts 314, the toes 312 on the rock-shaft 307 carrying the hooks 308, impinge against the pins 313 on the bar 134 thus swinging the hooks rearward, as previously mentioned, and perforce disengaging them from the end folds 116 in order to permit the succeeding upward and forward movement of the fly-frame and its appurtenances.

The means herein illustrated for operating the fly-frame in timed relation to the cover conveyer is as follows: Fast on the midportion of the rock-shaft 304 is an arm 318 which is depending when the frame is in the forwardly extending position shown in Fig. 29. This arm 318 is pivotally connected by means of a link 319 to the free end of a lever 320 which is fulcrumed on a stud 321 supported by a standard 322 on the bed 61. The lever is provided with a lateral roll 323 which is held yieldingly in contact with the periphery of a cam 324 on the main shaft 64 by a suitably-disposed spring, as 325; the contour of the cam being such that in one half rotation to the shaft 64 during a dwell of the conveyer, the cam, in conjunction with the spring, effects the reciprocation of the lever 320 and the resulting oscillation of the fly-frame, and in the remaining one-half rotation of the shaft 64 the lever is held in depressed position to maintain the fly-frame forwardly projected and in proper position to receive the next succeeding pair of match covers.

As the conveyer progresses from the final folding station the folded rearward ends of the two partially completed match packets escape the guide bar 134 and pass into the flared open end of a longitudinally extending channel structure which is supported on the bar 76. This structure, in the form shown, comprises a base section 326 which constitutes in effect a continuation of the guide bar 134, and an overhanging plate 327 supported on a spacer bar 328 which is fixed to the base section, thus providing a relatively shallow channel which compresses the folds 115 and 116 of each of the covers during their travel, so that the folds bear laterally against the stems of the interposed matches and that the inner edges of such folds bear hard against or engage the opposing end of the holder member H. (See Figs. 11, 12, 30 and 33.)

The two partially completed match packets as they progress are presented by the conveyer 66 to means whereby pressure effective to squeeze or compress the walls of the covers against the match stems is applied to the covers of the packets rearwardly of the match heads. (See Figs. 6 and 12.) The means herein illustrated for this purpose is generally similar to that previously described for pressing the heads of the matches to the same horizontal plane in the links of the match conveyer. It comprises a longitudinally extending bar 329 which overhangs two adjoining links of the cover conveyer and supports two resilient presser bars 330 which are arranged in endwise spaced relation so as to enter and recede from the pockets of the respective links during each dwell of the cover conveyer. The bar 329 is supported by vertically movable rods 331 which are connected at their lower ends by a foot bar 332. The latter bar is linked to a lever 333 which is fulcrumed on a hanger 334 depending from the table 63, and which lever bears a lateral roll 335 operatively fitted in the groove of a suitable face cam 336 fast on the main shaft 64.

As the conveyer progresses from the holder pressing station just described it transports the two leading packets to the action of means whereby the folds 115 and 116 and the respective walls of each cover are pinched and fastened together at the ends of the folds. (See Figs. 6, 12 and 34.)

The means herein illustrated for this purpose comprises two pairs of wire stitchers 337 of any usual or approved construction. These stitchers are supported on the table 63, rearward of the cover conveyer 66, and in such relation thereto that the folded ends of two adjacent packets are successively advanced, first, to a position under one pair of staple inserting heads 338 the vertically reciprocating plungers of which drive two staples into and transversely of the trailing ends of the folds of the respective packets, and, then, to a second pair of heads of which the plungers drive two staples into the leading ends of the folds, thus completing the packets. The plungers enter and recede from suitably spaced openings in the top plate 327 of the channel structure through which the folded ends of the respective covers progress. In the present instance the operating shafts 339 of the respective stitchers are driven from a longitudinally extending shaft 340 having its bearings in brackets 341 on the rear of the table 63. The shaft 340 has fast thereon a sprocket wheel 342 which is connected with and driven from a similar wheel 343 on a lower shaft 344 by means of a chain 345. The shaft 344 has its bearings in standards 346 on the bed 61, and is provided with a bevel gear 347 in mesh with a similar gear 348 on one end of a transverse shaft 349 having its bearings in standards 350 on the bed. The opposite end of the shaft 349 has a bevel gear 351 in mesh with a similar gear 352 on the main shaft; the ratio of the gears being such that the stitchers are simultaneously actuated in timed relation to the cover conveyer.

Figure 6:
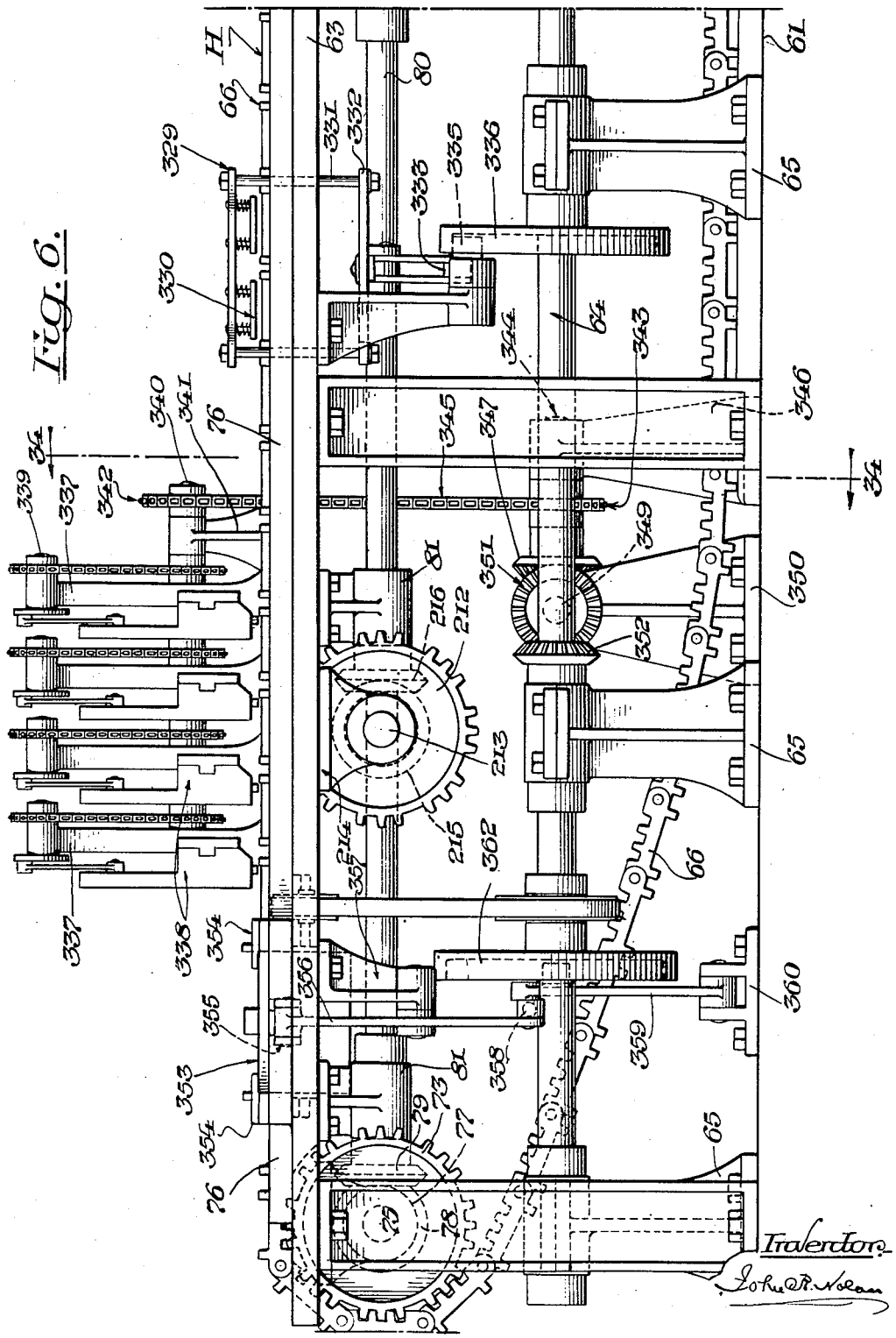
Figure 7:
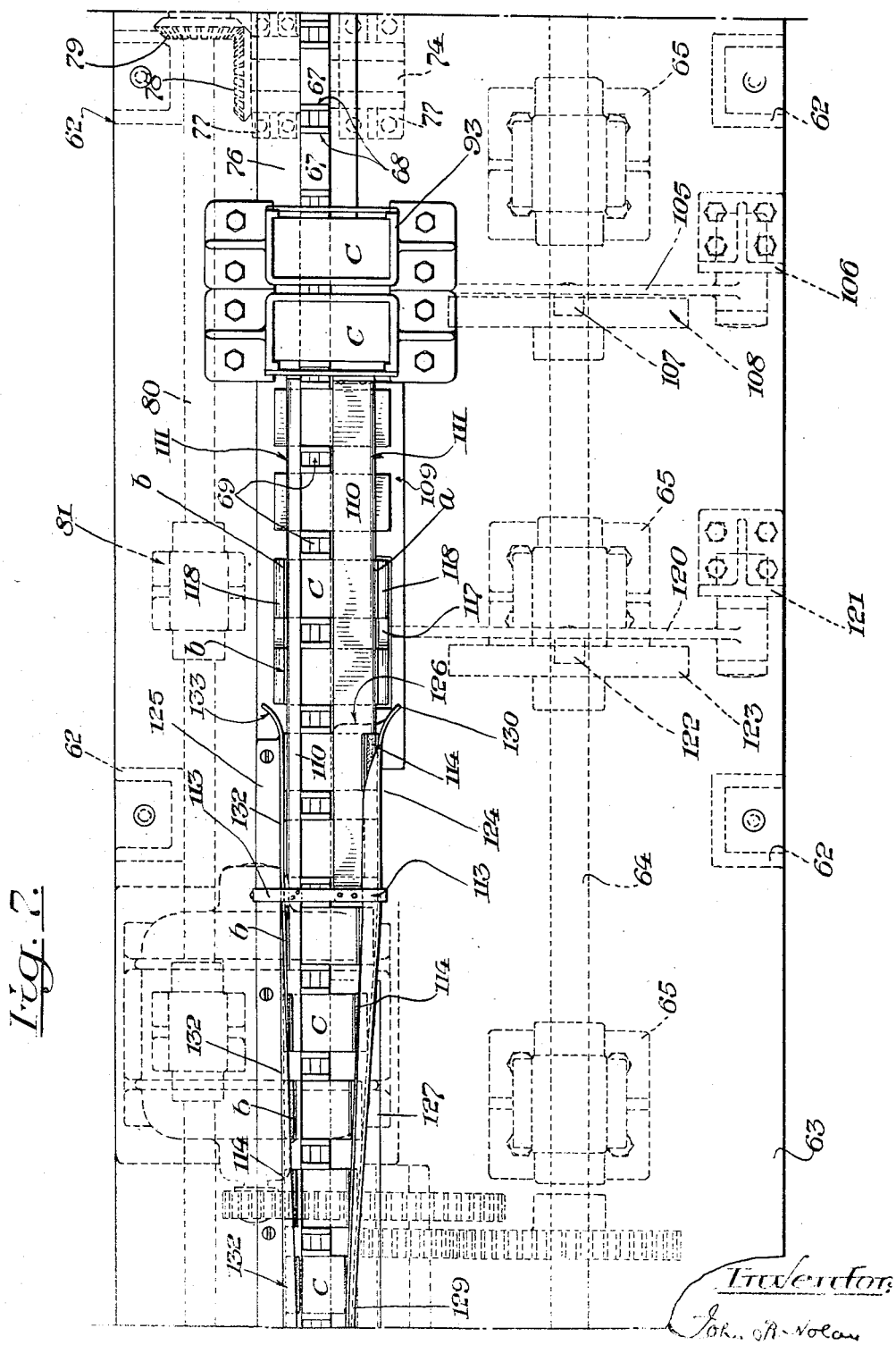
Figs. 7, 8, 9, 10, 11 and 12 are plans of the mechanisms shown in Figs. 1, 2, 3, 4, 5 and 6, respectively.
Figure 8:
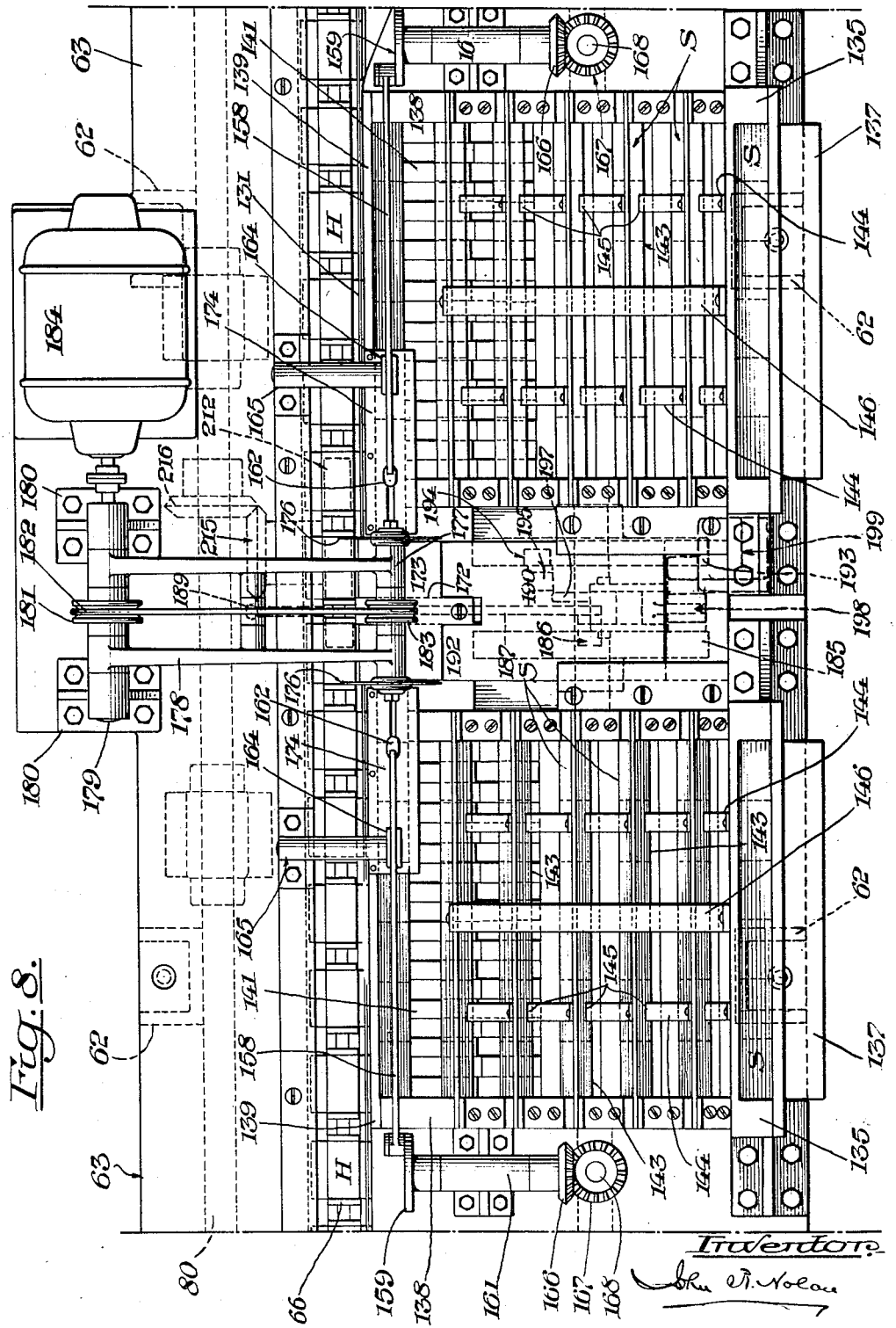
Figure 9:
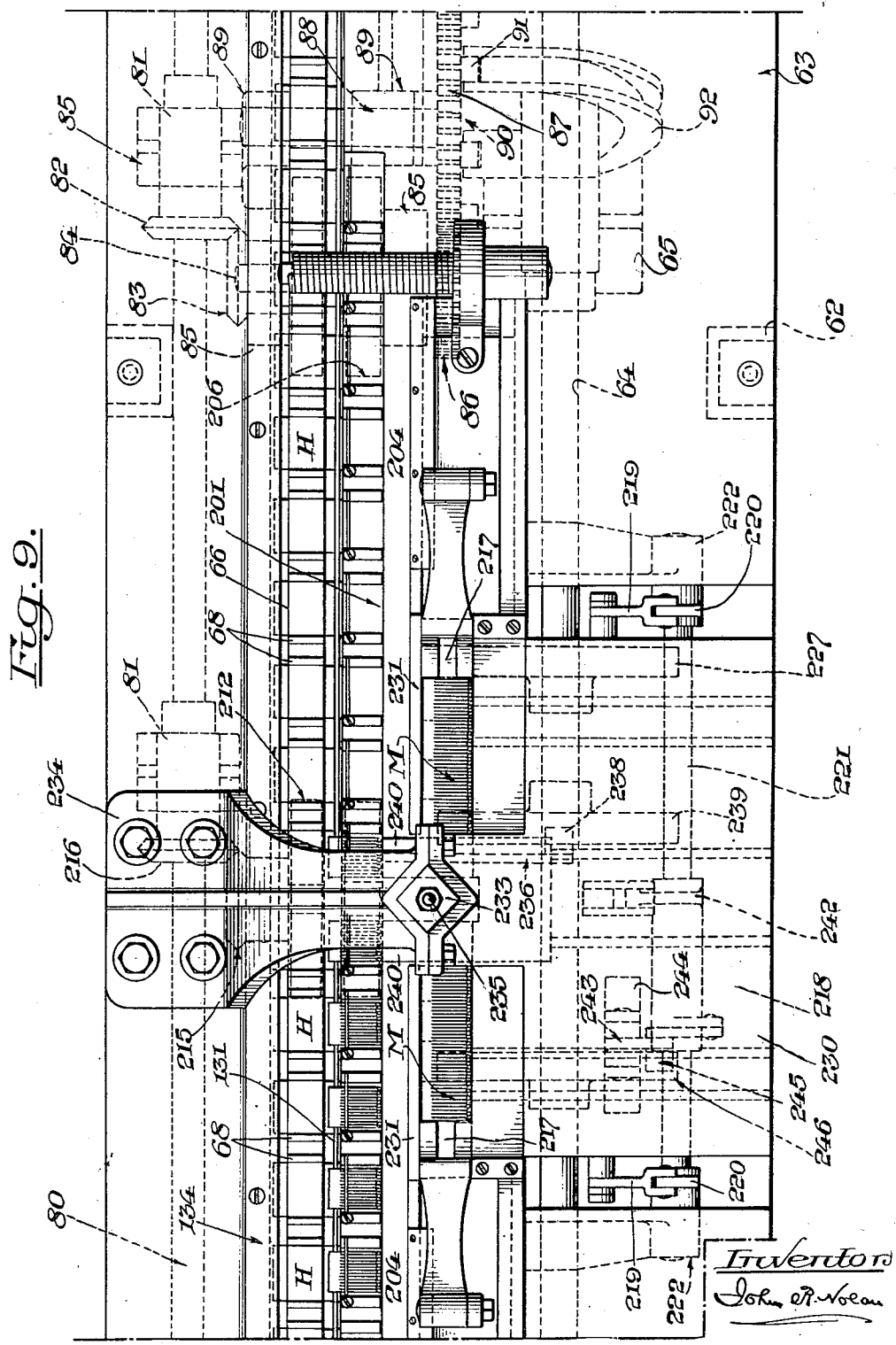
Figure 12:
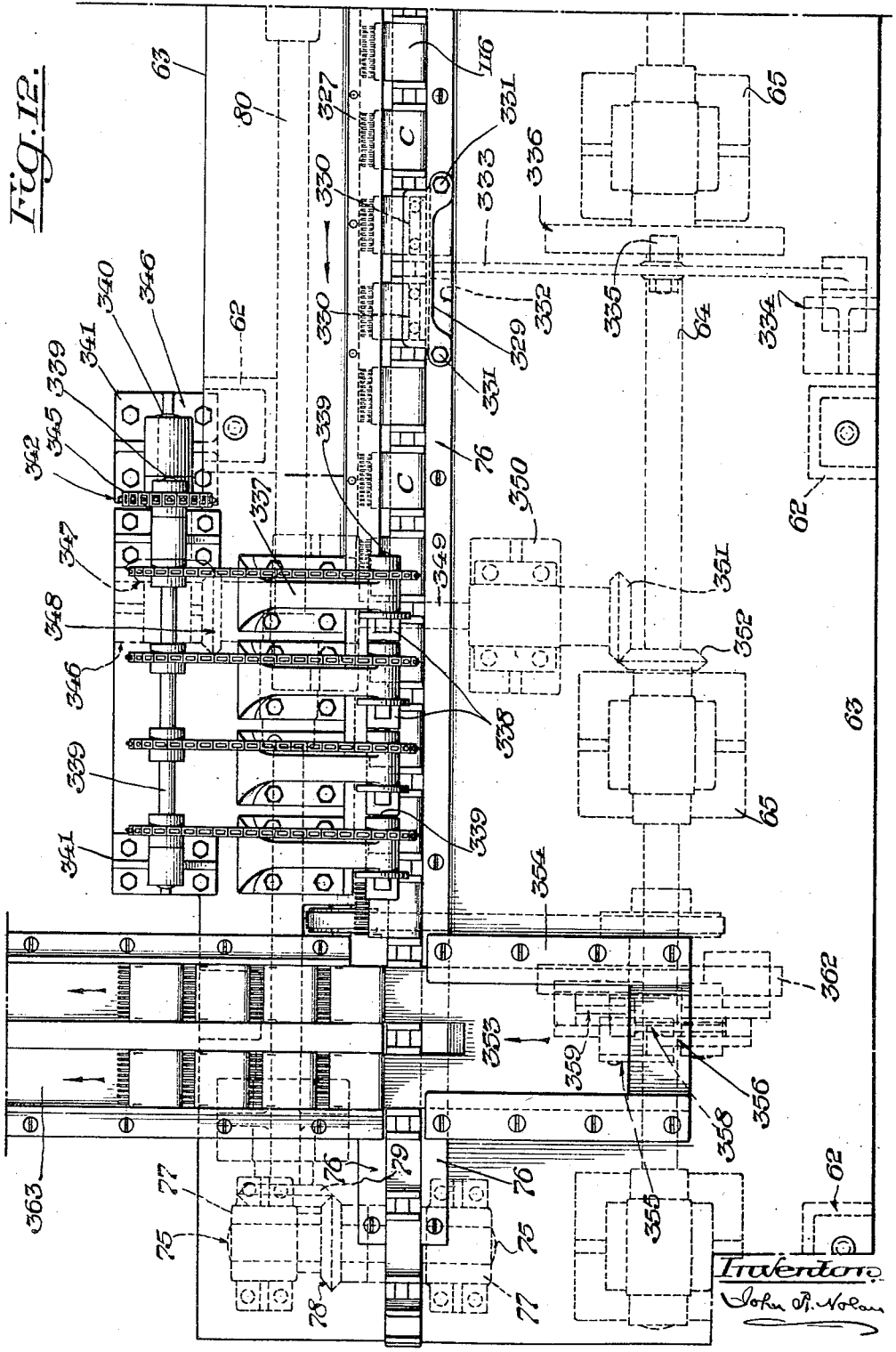
Figure 13:
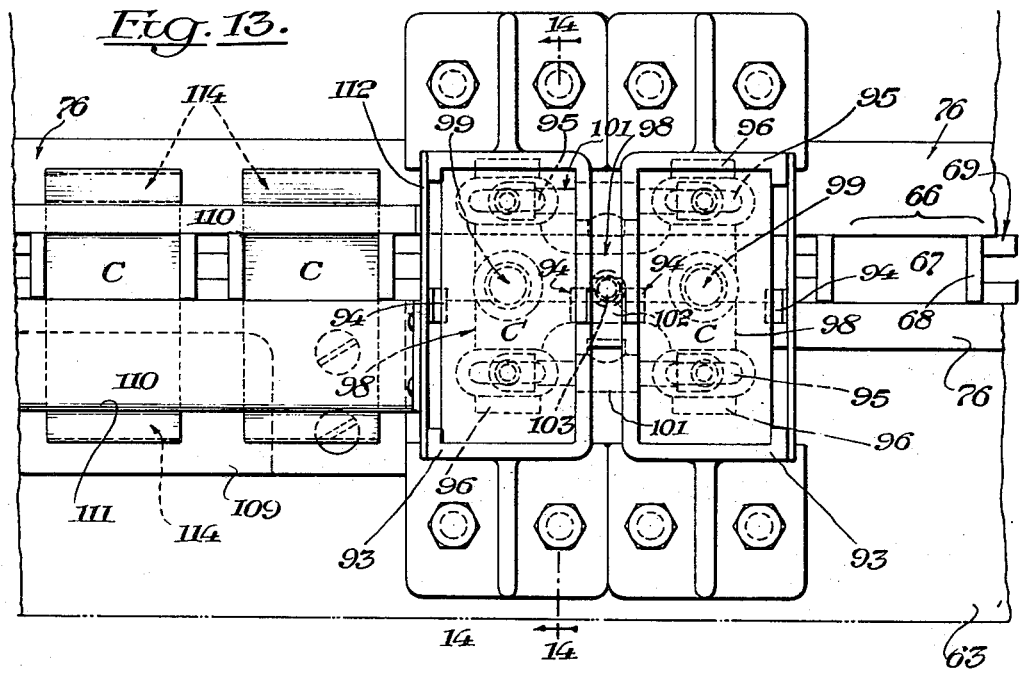
Fig. 13 is a plan of the cover strip hoppers and the adjacent parts of the cover conveyer and adjuncts.
Figure 14:
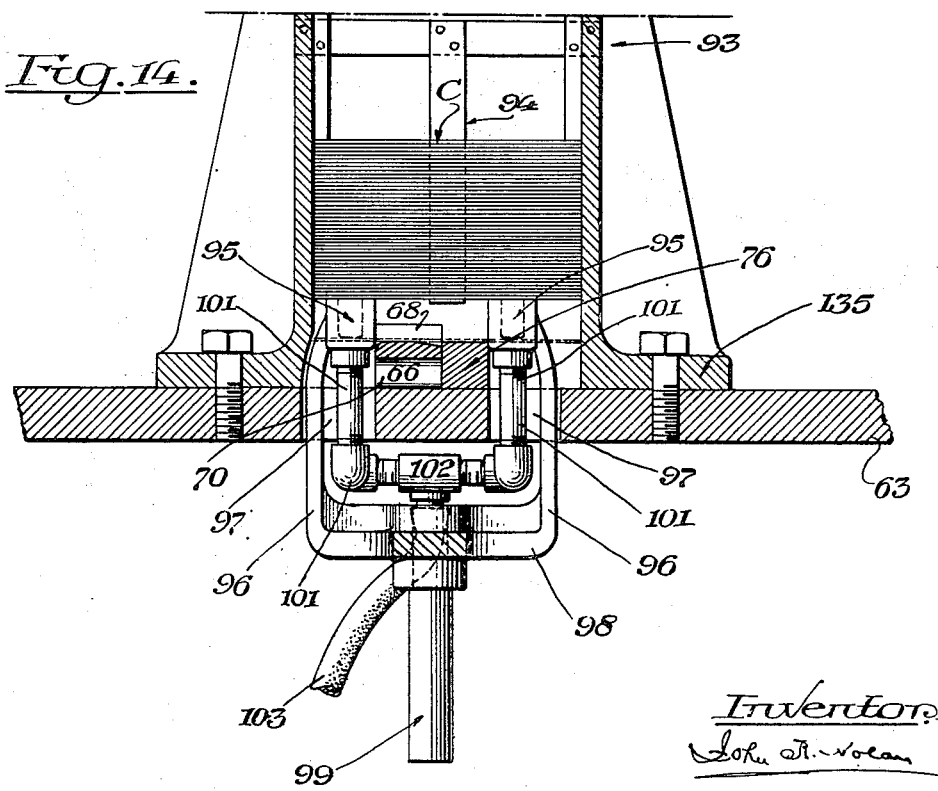
Fig. 14 is a transverse vertical section in a plane through one of the cover-strip hoppers, as on the line 14—14 of Fig. 13.
Figure 34:
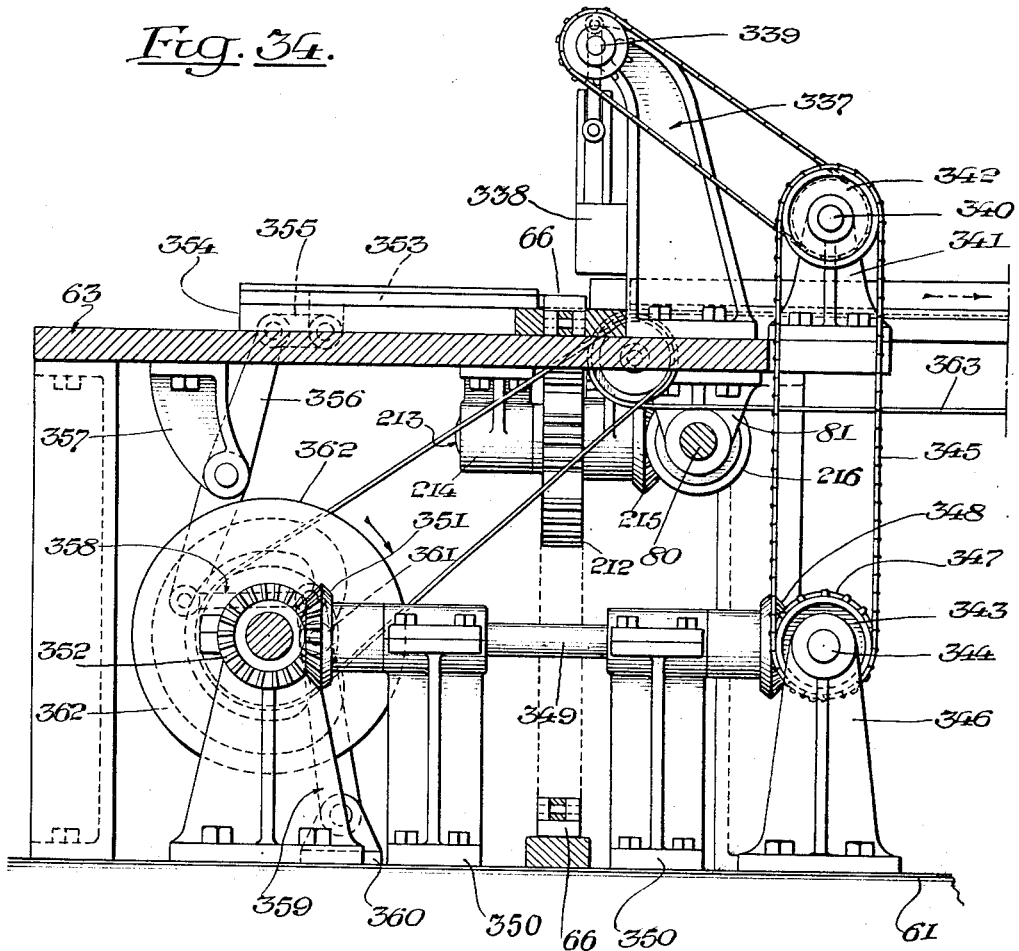
Fig. 34 is a similar section in a plane adjacent the binding or stapling mechanisms, as on the line 34—34 of Fig. 6.

The now finished packets are advanced in pairs by the conveyer 66 to a discharging station where they are ejected flatwise from the conveyer by a suitably-located reciprocating bifurcated slide 353, reference being had to Figs. 6, 12 and 34 of the drawings.

The slide 353 is mounted in a guide structure 354 at the front of the discharging end of the table, adjacent the path of the cover conveyer, so as to be reciprocable through and transversely of two adjacent links of the conveyer. The slide is pivotally connected by means of a link 355 to the upper arm of a lever 356 which is fulcrumed on a hanger 357 depending from the table. The lower arm of the lever is pivotally connected by means of a link 358 to an upstanding arm 359 which is pivoted to a bracket 360 on the bed 61. This arm has a lateral roll 361 which is operatively fitted in the groove of a face cam 362 fast on the main shaft, the contour of the groove being such that in each dwell of the conveyer 66 the lever 356 is oscillated, and the slide 353 is accordingly moved through and from the upper run of the conveyer so as to eject the opposing match packets therefrom and upon an off-bearing belt 363, which may be conveniently driven from the main shaft.

It is to be understood that the machine herein disclosed to exemplify my invention may be modified within the principle of the invention and the fair scope of the appended claims.

I claim:

1. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a matchholder borne by the cover conveyer, means for applying match holders to the bodies of the respective cover strips imposed on the cover conveyer, means for inserting in the respective holders rows of matches supported by the adjacent members of the match conveyer so that the stem ends of the matches protrude beyond the holders, means for folding the cover strips upon the proximate holders and with the resilient end folds of the strips positioned across the protruding match stems, and means for pinching and fastening the ends of said resilient folds to the walls of the respective covers.

2. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, said means including a pusher having at its acting end spaced centralizing projections for engaging the opposing end of each holder, means for inserting in the respective holders rows of matches supported by the adjacent members of the match conveyer so that the stem ends of the matches protrude beyond the holders, means for folding the cover strips upon the proximate holders and with the resilient end folds of the strips positioned across the protruding match stems, and means for pinching and fastening the ends of said resilient folds to the walls of the respective covers.

3. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, means for inserting in the respective holders rows of matches supported by the adjacent members of the match conveyer so that the stem ends of the matches protrude beyond the holders, means for folding the cover strips upon the proximate holders and with the resilient end folds of the strips positioned across the protruding match stems, means for pressing against the match stems the walls of the cover strips and the associated match holders, and means for pinching and fastening the ends of said resilient folds to the walls of the respective covers.

4. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, said bending means including a mandrel arranged in spaced parallel relation to the adjacent outer ends of the cover strips, an ironing member for turning up said outer ends against the opposing longitudinal edge of the mandrel, and means for thereafter folding the up-turned ends upon the top of the mandrel, means for applying match holders to the bodies of the respective cover strips imposed on the cover conveyer, means for inserting in the respective holders rows of matches supported by the adjacent members of the match conveyer so that the stem ends of the matches protrude beyond the respective holders, means for folding the cover strips upon the proximate holders and with the resilient end folds of the strips positioned across the protruding match stems, and means for pinching and fastening the ends of said resilient folds to the walls of the respective covers.

5. The combination with juxtaposed cover and match conveyers each comprising a succession of supporting members, means for imposing cover strips of flexible material on and transversely of the supporting members of the cover conveyer, means for bending at least one end fold arranged and adapted to be drawn against match stems protruding from match holders borne by the cover conveyer, means for applying match holders to the bodies of the respective strips imposed on the cover conveyer, means for inserting in the respective holders rows of matches supported by the adjacent members of the match conveyer so that the stems of the matches protrude beyond the respective holders, means for folding the cover strips upon the proximate holders and with the resilient end folds of the strips positioned across the match stems protruding from the respective covers, said folding means including a fly-frame having retaining members arranged to overhang the resilient folds presented thereto, means for actuating said retaining members to free therefrom the resilient folds of the respective cover strips when said strips are folded upon the holders, and means for operating said fly-frame in timed relation to the cover conveyer, and means for pinching and fastening the ends of said resilient folds to the walls of the respective covers.

6. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, said holder-applying means including a support extending longitudinally of and in lateral relation to the conveyer, means for intermittently feeding a holder strip along said support, means for severing sections of determined length from the leading end of the holder strip, and means for inserting each succeeding severed holder section flatwise in the conveyer and imposing it on the associated cover strip, means for inserting in the respective match holders rows of matches supported by the adjacent members of the match conveyer so that the stem ends of the matches protrude beyond the holders, means for folding the cover strips upon the proximate match holders and with the resilient end folds positioned across the protruding match stems, and means for pinching and fastening the ends of said resilient folds to the walls of the respective covers.

7. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, means for severing matches from match cards supported by the match conveyer, means for inserting the severed matches into the respective holders so that the stem ends of the matches protrude beyond the holders, means for folding the cover strips upon the proximate holders and with the resilient end folds positioned across the protruding match stems, and means for pinching and fastening the ends of said resilient folds to the walls of the respective covers.

8. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, means for severing matches from match cards supported by the match conveyer and for inserting the severed matches into the respective holders so that the stem ends of the matches protrude beyond the holders, said severing means comprising cutters which incise the bases of the match cards longitudinally of the match stems to produce severed matches, and a pusher for the said matches, means for folding the cover strips upon the proximate holders and with the resilient end fold positioned across the protruding match stems, and means for pinching and fastening the ends of said resilient folds to the walls of the respective covers.

9. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, means for incising the bases of match cards to produce severed matches supported by the match conveyer, means for laterally spacing the adjacent matches, means for inserting the said matches into the respective holders on the cover conveyer so that the stem ends of the matches protrude beyond the holders, means for folding the cover strips upon the proximate holders and with the resilient end fold positioned across the protruding match stems, and means for pinching and fastening the ends of said resilient folds to the walls of the respective covers.

10. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, means for incising the bases of match cards having overlapping staggered match heads and supported by the match conveyer, means for depressing the upper match heads to the same plane as the lower contiguous heads, means for laterally spacing the adjacent matches, means for inserting the said matches into the respective holders on the cover conveyer so that the stem ends of the matches protrude beyond the holders, means for folding the cover strips upon the proximate holders and with the resilient end fold positioned across the protruding match stems, and means for pinching and fastening the ends of said resilient folds to the walls of the respective covers.

11. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, means for incising the bases of match cards to produce severed matches supported by the match conveyer, means including a reciprocating comb element having parallel pins which enter between and laterally space the adjacent matches, means for inserting the spaced matches into the respective holders on the cover conveyer so that the stem ends of the matches protrude beyond the holders, means for folding the cover strips upon the proximate holders and with the resilient end folds of the strips positioned across the protruding match stems, and means for pinching and fastening the ends of said resilient folds to the walls of the respective covers.

12. The combination with juxtaposed cover and match conveyers each comprising a succession of supporting members, means for imposing cover strips of flexible material on and transversely of the supporting members of the cover conveyer, means for bending at least one end portion of each cover strip to provide a resilient end fold arranged and adapted to be drawn against match stems protruding from a match holder borne by the cover conveyer, means for applying match holders to the bodies of the respective cover strips imposed on the cover conveyer, means for incising the bases of match cards having overlapping staggered match heads and supported by the match conveyer, means including a reciprocating resilient presser element for depressing the upper match heads to the same plane as the lower contiguous heads, means for laterally spacing the adjacent matches, means for inserting the matches into the respective holders on the cover conveyer so that the stem ends of the matches protrude beyond the holders, means for folding the cover strips upon the proximate holders and with the resilient end folds of the strips positioned across the match stems protruding from the respective holders, and means for pinching and fastening the ends of said resilient folds to the walls of the respective covers.

13. In a match packeting machine having a conveyer for cover strips of flexible material, means for bending one end portion of each cover strip to provide a resilient end fold, said means comprising a stationary mandrel arranged in spaced parallel relation to the adjacent outer ends of the cover strips borne by the conveyer, an ironing member for bending said outer ends against the opposing longitudinal edge of the mandrel, and a stationary elongated folding member having a channeled portion into which said mandrel extends and by which portion the bent ends of the strips are progressively folded over upon the mandrel during the travel of said strips in the conveyer.

14. In a match packeting machine having a conveyer comprising a succession of cover supporting members, means for imposing cover strips on and transversely of the said members with the ends of the strips extending outwardly beyond the respective sides of the conveyer, spaced parallel bars constituting mandrels overhanging the paths of the extending portions of the cover strips and arranged in parallelism with and inwardly of the extremities of said strips, and means for folding the projecting extremities of the strips upwardly against the outer edges and over upon the tops of the respective mandrels, whereby resilient end folds for the respective ends of each cover strip is provided.

15. In a match packeting machine having a conveyer comprising a succession of cover supporting members, means for imposing cover strips on and transversely of the said members with the ends of the strips extending outwardly beyond the respective sides of the conveyer, spaced parallel bars constituting mandrels overhanging the paths of the extending portions of the cover strips and arranged in parallelism with and inwardly of the extremities of said strips, and means for folding the projecting extremities of the strips upwardly against the outer edges and over upon the tops of the respective mandrels, whereby resilient end folds for the respective ends of each cover strip is provided, said folding means including vertically reciprocative ironing members adjacent the paths of the outer edges of the respective mandrels and arranged and adapted to bend the opposing ends of the cover strips upwardly during a dwell of the conveyer, and channeled folding members for receiving and progressively folding such upstanding ends upon the mandrels during the travel of the conveyer.

16. In a match packeting machine embodying means for supporting channeled match holding material and means for inserting parallel stems endwise in the channels of said material, of means for centralizing said channels in successive series preparatory to the insertion of the matches therein, said last-named means comprising a reciprocative element having spaced centralizing projections for engaging the opposing ends of the channels.

17. In a match packeting machine having a conveyer for the reception of cover strips of flexible material, means for inserting channeled match holders of flexible material in said conveyer and upon the respective cover strips borne thereby, said means including a pusher member having spaced centralizing members for engaging the opposing channels of each holder, and means for reciprocating said pusher in timed relation to the conveyer.

18. In a match packeting machine having a conveyer for flexible cover strips and associated match holders, means for feeding holder strips in spaced parallel relation and positioning each succeeding leading holder strip laterally adjacent to and longitudinally of the said conveyer, means for feeding said positioned strip longitudinally step-by-step, means for successively severing match holder sections from the leading end of said positioned strip, and means for pushing each severed holder section snugly into said conveyer and upon a cover strip borne thereby, said pushing means comprising a reciprocative slide having spaced centralizing members for engaging the opposing channels of each holder section.

19. In a match packeting machine having a conveyer for flexible cover strips and associated match holders, each strip borne by the conveyer having a projecting portion terminating in a resilient fold, means for bodily folding said projecting portion over the adjacent match holder, said folding means including a fly-frame having thereon relatively movable retaining members for the resilient fold of the said projecting portion, means for actuating said retaining members to free therefrom the resilient fold when the said projecting portion is folded upon the adjacent match holder, and means for operating the said fly-frame in timed relation to the said conveyer.

20. In a match packeting machine having a conveyer for match cards each card having an uncut base portion, mechanism including parallel cutters for incising the base of the card to produce severed matches, and means for laterally spacing in parallelism the stems of the severed matches borne by the conveyer.

21. In a match packeting machine having a conveyer for match cards, the matches of each card having overlapping staggered heads, means for incising the base of the card to produce severed matches, means including a reciprocative member overhanging the upper match heads and operative to depress them to the same plane as the lower contiguous heads, and means including a movable comb element having parallel pins which enter between and laterally space in substantial parallelism the stems of the severed matches borne by the conveyer.

JOHN R. NOLAN.